(12) United States Patent
Reynolds et al.

(10) Patent No.: US 11,473,576 B2
(45) Date of Patent: Oct. 18, 2022

(54) PUMP WITH HIGH TORQUE DRIVE

(71) Applicant: Graco Minnesota Inc., Minneapolis, MN (US)

(72) Inventors: Jeremy Scott Reynolds, Flagstaff, AZ (US); Thomas F. Janecek, Flagstaff, AZ (US); Tyler K. Williams, Flagstaff, AZ (US); Steven D. Becker, Inver Grove Heights, MN (US); Alexander J. Daeger, Roseville, MN (US); Andrew J. Kopel, Stanchfield, MN (US); Jarrod C. Drexler, Monticello, MN (US); Douglas S. Ryder, Buffalo, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 17/453,592

(22) Filed: Nov. 4, 2021

(65) Prior Publication Data
US 2022/0056909 A1      Feb. 24, 2022

Related U.S. Application Data

(63) Continuation of application No. 17/226,712, filed on Apr. 9, 2021, now Pat. No. 11,193,486, which is a continuation of application No. PCT/US2021/025133, filed on Mar. 31, 2021.
(Continued)

(51) Int. Cl.
*F04C 15/00* (2006.01)
*F04C 3/04* (2006.01)
(Continued)

(52) U.S. Cl.
CPC ............ *F04C 15/008* (2013.01); *F04B 17/03* (2013.01); *F04C 3/04* (2013.01); *F04D 13/06* (2013.01);
(Continued)

(58) Field of Classification Search
CPC ............................ F04B 17/03; H02K 2201/12
See application file for complete search history.

(56) References Cited

U.S. PATENT DOCUMENTS 5,312,233 A * 5/1994 Tanny ..................... F04B 13/00
                                                                              417/415
6,092,995 A   7/2000 Morikawa
(Continued)

FOREIGN PATENT DOCUMENTS

| DE | 4300512 | 7/1994 |
| DE | 102010018145 A1 | 10/2011 |
| WO | 2012125790 A2 | 9/2012 |

OTHER PUBLICATIONS

International Search Report and Written Opinion for PCT Application No. PCT/US2021/025133, dated Jun. 4, 2021, pp. 12.

*Primary Examiner* — Patrick Hamo
(74) *Attorney, Agent, or Firm* — Kinney & Lange, P. A.

(57) ABSTRACT

A fluid moving apparatus includes an electric motor having a rotor and a stator and a fluid displacement member. The rotor rotates relative to the stator on a common axis to generate a rotational output. The rotational output is provided to the fluid displacement member to power the fluid displacement member to one of move linearly along and rotate about the common axis. The stator includes one or more coils configured to power rotation of the rotor. The one or more coils extend circumferentially around and can be coaxial on the common axis.

23 Claims, 15 Drawing Sheets

Related U.S. Application Data

(60) Provisional application No. 63/003,021, filed on Mar. 31, 2020.

(51) Int. Cl.
  *F04B 17/03* (2006.01)
  *F04D 25/06* (2006.01)
  *F04D 13/06* (2006.01)

(52) U.S. Cl.
  CPC .......... *F04D 25/06* (2013.01); *F04C 2240/10* (2013.01); *F04C 2240/20* (2013.01); *F04C 2240/401* (2013.01); *H02K 2201/12* (2013.01)

(56) References Cited

U.S. PATENT DOCUMENTS

| | | | |
|---|---|---|---|
| 6,935,846 B2* | 8/2005 | Jesse | F04B 43/0072 417/244 |
| 7,242,118 B2* | 7/2007 | Sakamoto | H02K 33/16 310/15 |
| 7,492,074 B1 | 2/2009 | Rittenhouse | |
| 7,626,308 B2* | 12/2009 | Kang | H02K 21/225 310/254.1 |
| 8,053,944 B2 | 11/2011 | Calley et al. | |
| 8,405,275 B2 | 3/2013 | Calley et al. | |
| 10,046,351 B2* | 8/2018 | Brudevold | F04B 49/065 |
| 10,594,192 B1* | 3/2020 | Kaul | H02K 3/28 |
| 2005/0104469 A1* | 5/2005 | Zepp | H02K 11/21 310/191 |
| 2008/0179982 A1* | 7/2008 | Kramer | H02K 1/182 310/12.01 |
| 2009/0108712 A1 | 4/2009 | Holtzapple et al. | |
| 2011/0133485 A1* | 6/2011 | Gieras | B64D 41/007 290/1 R |
| 2012/0119599 A1 | 5/2012 | Calley et al. | |
| 2013/0015733 A1* | 1/2013 | Rasch | H02K 3/525 310/59 |
| 2015/0048712 A1 | 2/2015 | Janecek et al. | |
| 2021/0301819 A1* | 9/2021 | Reynolds | F04B 15/02 |

* cited by examiner

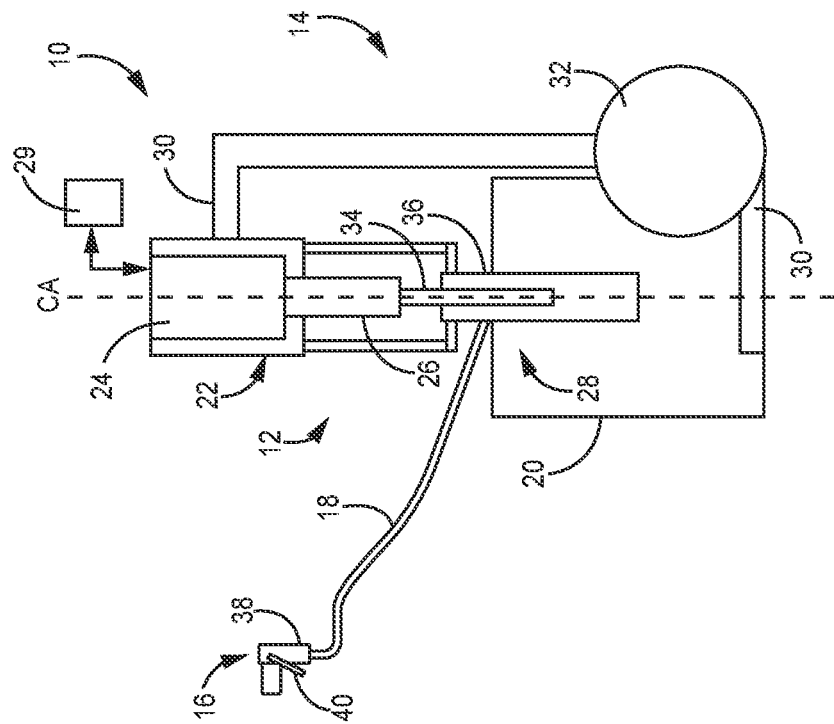
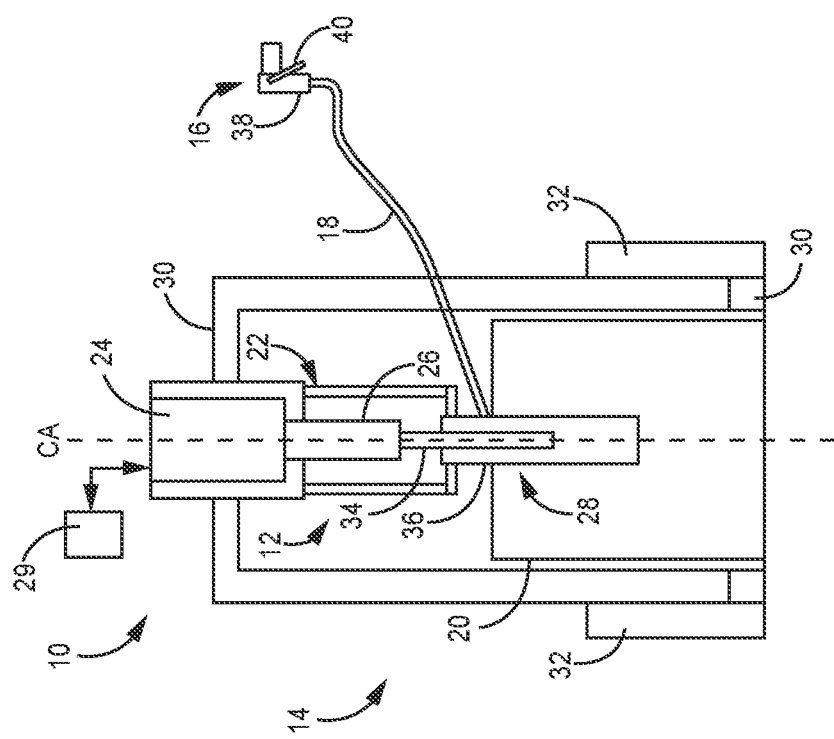

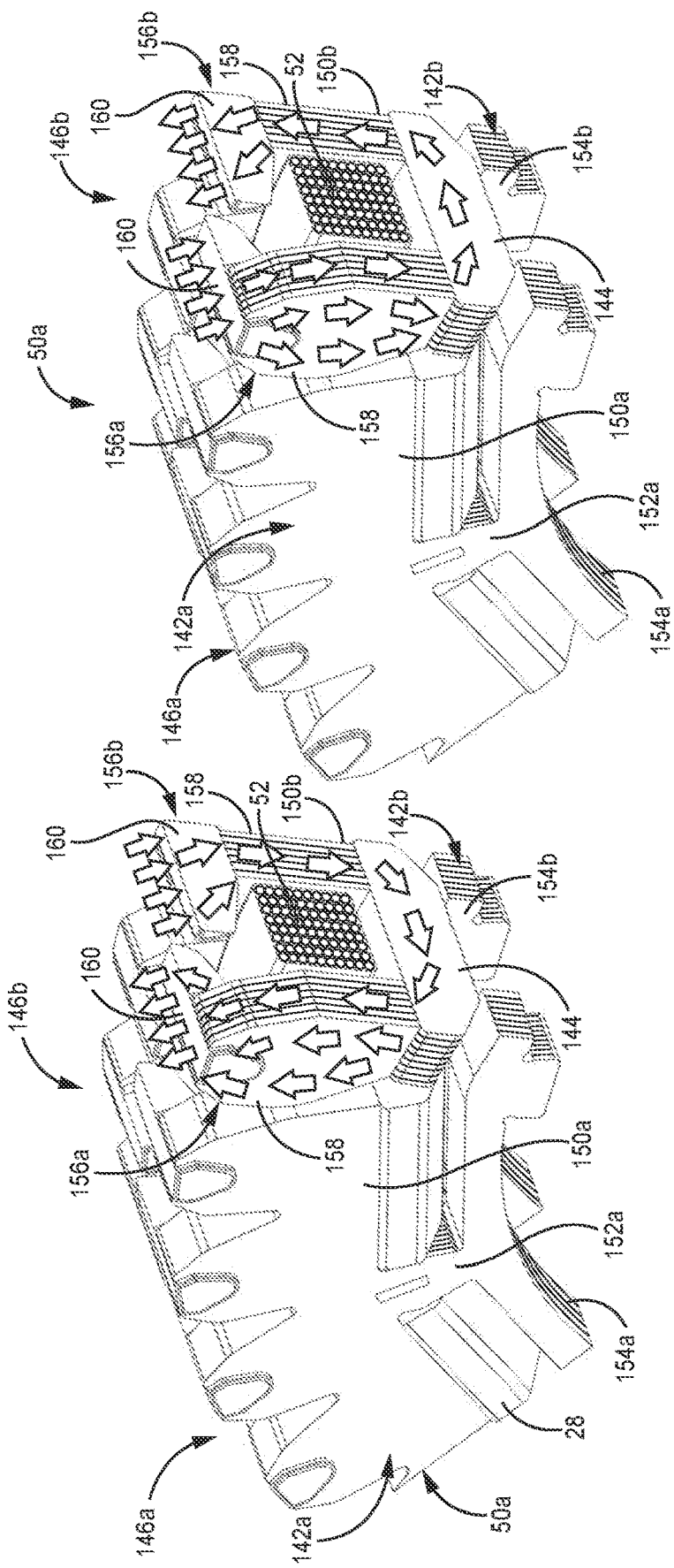

PUMP WITH HIGH TORQUE DRIVE

CROSS-REFERENCE TO RELATED APPLICATION(S)

This application is a continuation of U.S. application Ser. No. 17/226,712 filed Apr. 9, 2021 and entitled "PUMP WITH HIGH TORQUE DRIVE," which in turn is a continuation of International PCT Application No. PCT/US2021/25133 filed Mar. 31, 2021 and entitled "PUMP WITH HIGH TORQUE DRIVE," which claims the benefit of U.S. Provisional Application No. 63/003,021 filed Mar. 31, 2020 and entitled "PUMP WITH HIGH TORQUE DRIVE," the disclosures of which are hereby incorporated by reference in their entireties.

BACKGROUND

This disclosure relates to pump systems. More specifically, this disclosure relates to drives for fluid moving apparatuses for use in various applications, such as pump apparatuses.

Typically, the fluid being pumped is placed under pressure by a positive displacement pump. In a painting application, the pump places the paint under pressure and outputs the paint under pressure through a flexible hose. A spray gun is used to dispense the paint, the gun being attached to the end of the hose opposite the pump. The positive displacement pump is typically mounted to a drive housing and driven by a motor. A pump rod is attached to a reciprocating drive that drives reciprocation of the pump rod, thereby pulling fluid from a container into the pump and then driving the fluid downstream from the pump. In some cases, electric motors can power the pump. The motor is attached to the pump via a gear reduction system that increases the torque generated by the motor.

SUMMARY

According to one aspect of the disclosure, a pump apparatus for pumping fluid includes an electric motor configured to generate a rotational output, a drive configured to convert the rotational output from the electric motor into a linear reciprocating output, and a fluid displacement member configured to receive the linear reciprocating output from the drive to be linearly reciprocated along the common axis to pump fluid. The electric motor includes a rotor configured to rotate about a common axis, the rotor comprising a plurality of magnets, each magnet elongate and extending parallel with the common axis, the plurality of magnets annularly arrayed around the common axis; and a stator configured to be electrically energized to generate magnetic flux that causes the rotor to rotate. The stator includes a plurality of coils, the plurality of coils arrayed along the common axis, each coil of the plurality of coils coaxial with the common axis; and a plurality of circular spur arrays that are arrayed along the common axis, each circular spur array of the plurality of circular spur arrays respectively includes a plurality of spurs that are arrayed in a circle coaxial with the common axis, all spurs of the plurality of spurs configured to be polarized simultaneously by a coil of the plurality of coils to generate flux to rotate the rotor relative to the stator.

According to an additional or alternative aspect of the disclosure, a pump apparatus includes an electric motor comprising a stator and a rotor that rotates coaxially about a common axis, the stator comprising a plurality of coils arrayed along the common axis; a fluid displacement member, the fluid displacement member configured to reciprocate linearly along the common axis to pump fluid; and a drive mechanism located axially between the motor and the piston that converts a rotational output from the motor to a linear reciprocating output that drives the fluid displacement member. The drive mechanism is configured such that the fluid displacement member travels one inch per a first number of complete revolution of the motor, wherein the first number is in the range of 0.9-3.0 revolutions, inclusive.

According to another additional or alternative aspect of the disclosure, a pump apparatus includes an electric motor comprising a stator and a rotor that rotates about a common axis, the stator comprising a plurality of coils arrayed along the common axis; a fluid displacement member, the fluid displacement member configured to reciprocate linearly along the common axis CA to pump fluid; and a drive mechanism located between the motor and the piston that converts rotational output from the motor to linear reciprocating output that drives the piston. The drive mechanism is configured such that the fluid displacement member complete one pump stroke per X number of complete revolution of the motor, wherein X is in the range of 1-3, inclusive.

According to yet another additional or alternative aspect of the disclosure, a pump apparatus includes an electric motor comprising a stator and a rotor that rotates about a common axis, the stator comprising a plurality of coils arrayed along the common axis, each coil extending around and coaxial with the common axis; a cylindrical piston, the piston coaxial with the common axis, the piston configured to reciprocate linearly along the common axis to pump fluid; and a drive mechanism located between the motor and the piston that converts a rotational output from the motor to a linear reciprocating output that drives the piston.

According to yet another additional or alternative aspect of the disclosure, an apparatus for moving a liquid includes an electric motor configured to generate a rotational output and a fluid displacement member configured to be rotated about a common axis by a rotor to move the liquid. The electric motor includes the rotor configured to rotate about the common axis, the rotor comprising a plurality of magnets, each magnet elongate and extending parallel with the common axis, the plurality of magnets annularly arrayed around the common axis; and a stator configured to be electrically energized to generate magnetic flux that causes the rotor to rotate. The stator includes a plurality of coils, the plurality of coils arrayed along the common axis, each coil of the plurality of coils coaxial with the common axis; and a plurality of circular spur arrays that are arrayed along the common axis, each circular spur array of the plurality of circular spur arrays respectively includes a plurality of spurs that are arrayed in a circle coaxial with the common axis, all spurs of the plurality configured to be polarized simultaneously by a coil of the plurality of coils to generate flux to rotate the rotor relative to the stator.

According to yet another additional or alternative aspect of the disclosure, an apparatus for moving a liquid includes an electric motor configured to generate a rotational output and a fluid displacement member configured to be moved by the output of the electric motor. The electric motor includes a rotor configured to rotate about a common axis, the rotor comprising a plurality of magnets, each magnet elongate and extending parallel with the common axis, the plurality of magnets annularly arrayed around the common axis; and a stator configured to be electrically energized to generate magnetic flux that causes the rotor to rotate. The stator includes a plurality of coils, the plurality of coils arrayed along the common axis, each coil of the plurality of coils coaxial with the common axis; and a plurality of circular spur arrays that are arrayed along the common axis, each circular spur array of the plurality of circular spur arrays respectively includes a plurality of spurs that are arrayed in a circle coaxial with the common axis, all spurs of the plurality configured to be polarized simultaneously by a coil of the plurality of coils to generate flux to rotate the rotor relative to the stator. At least one of the spurs of the stator is closer to the fluid displacement member than any one of the plurality of coils.

BRIEF DESCRIPTION OF THE DRAWINGS

FIG. 1A is a front elevational schematic block diagram of a pump apparatus.

FIG. 1B is a side elevational schematic block diagram of the pump apparatus of FIG. 1A.

FIG. 6A is an enlarged cross-sectional view showing electric flux flow through the phase assembly.

FIG. 6B is an enlarged cross-sectional view showing electric flux flow opposite to that shown in FIG. 6A.

DETAILED DESCRIPTION

Figure 2:
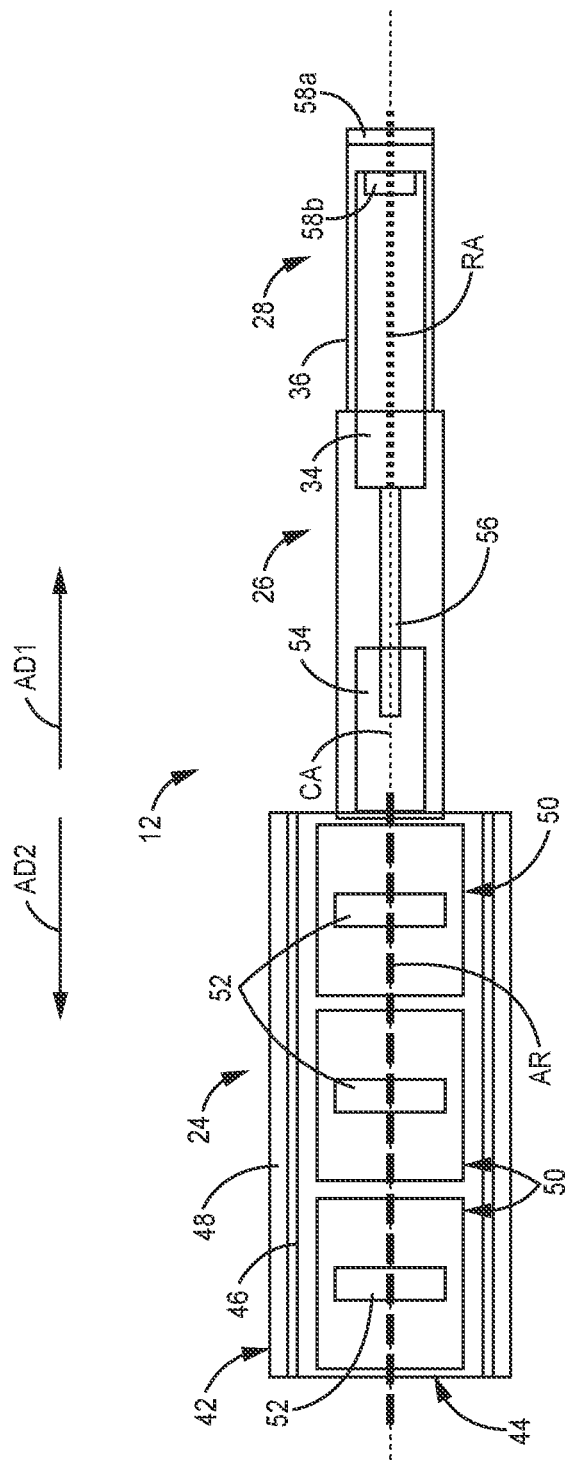
FIG. 2 is a schematic block diagram of a pump apparatus.

This disclosure is directed to a pump apparatus having an electric motor that rotates about a common axis and a pumping member that reciprocates along the common axis. The electric motor and the pumping member are coaxial on the common axis. The electric motor includes a rotor that rotates about the common axis and a stator that is electrically energized to generate magnetic flux that causes the rotor to rotate. The stator includes one or more coils that are each coaxial with the common axis.

FIG. 1A is a front elevational schematic block diagram of pump system 10. FIG. 1B is a side elevational schematic block diagram of pump system 10. FIGS. 1A and 1B will be discussed together. In this embodiment, the pump system 10 is set up as a spray system, such as for spraying paint or other liquid, however the pump system 10 can be setup for other pumping and fluid handling applications, such as location transfer, loading and unloading, spraying, metering, application, etc. Pump apparatus 12, support 14, spray gun 16, supply line 18, and reservoir 20 are shown. Pump apparatus 12 includes pump frame 22, motor 24, drive 26, displacement pump 28, and controller 29. Support 14 includes support frame 30 and wheels 32. Fluid displacement member 34 and pump body 36 of displacement pump 28 are shown. Spray gun 16 includes handle 38 and trigger 40.

Pump system 10 in this embodiment is a system for applying sprays of various fluids, examples of which include paint, water, oil, stains, finishes, aggregate, coatings, and solvents, amongst other options, onto a substrate. Pump apparatus 12 can generate high fluid pumping pressures, such as about 3.4-69 megapascal (MPa) (about 500-10,000 pounds per square inch (psi)) or even lower and/or higher. In some examples, the pumping pressures are in the range of about 20.7-34.5 MPa (about 2,000-4,000 psi). High fluid pumping pressure is useful for atomizing the fluid into a spray for applying the fluid to a surface. While pump apparatus 12 is described with regard to a spray system version of pump system 10, it is understood that pump apparatus 12 can be used for pumping in any desired system. For example, pump apparatus 12 can be used as a transfer pump to transfer fluids; can be used in a plural component spray system such as to feed a component fluid to a proportioning pump; in proportioning pumps; loading and unloading; metering; application; etc.

Pump apparatus 12 is configured to draw spray fluid from reservoir 20 and pump the fluid downstream to spray gun 16 for application on the substrate. Support 14 is connected to pump apparatus 12 and supports pump apparatus 12 relative reservoir 20. Support frame 30 is connected to pump frame 22. Wheels 32 are connected to support frame 30 to facilitate movement between job sites and within a job site. While pump apparatus 12 is described as supported by support 14, it is understood that pump apparatus 12 can be mounted to draw fluid in any desired manner. For example, pump apparatus 12 can be mounted on a lid of the reservoir 20 such that the reservoir 20 supports pump apparatus 12. Pump apparatus 12 can be directly mounted to the reservoir 20. For example, the reservoir can be a drum, such as a 55-gallon drum among other options, and pump apparatus 12 can be directly mounted to the drum. In such examples, pump apparatus 12 can be referred to as a drum pump.

Pump frame 22 supports other components of pump apparatus 12. Motor 24 and displacement pump 28 are connected to pump frame 22. Motor 24 is an electric motor having a stator and a rotor. The rotor is configured to rotate about an axis of rotation in response to current through the stator. The axis of rotation is coaxial with the indicated common axis CA. Motor 24 generates a rotational output coaxial with common axis CA.

The terms radial or radially as used herein means orthogonal to the common axis CA, unless otherwise noted. The terms axial or axially as used herein means parallel with the common axis CA, unless otherwise noted. The terms circumferential or circumferentially as used herein means around the common axis CA, unless otherwise noted.

Controller 29 is operably connected to motor 24, electrically and/or communicatively, to control operation of motor 24. Controller 29 thereby controls pumping by displacement pump 28. Controller 29 can be of any desired configuration for controlling pumping by displacement pump 28 and can include control circuitry and memory. Controller 29 is configured to store executable code, implement functionality, and/or process instructions. Controller 29 is configured to perform any of the functions discussed herein, including receiving an output from any sensor referenced herein, detecting any condition or event referenced herein, and controlling operation of any components referenced herein. Controller 29 can be of any suitable configuration for controlling operation of pump apparatus 12, gathering data, processing data, etc. Controller 29 can include hardware, firmware, and/or stored software. Controller 29 can be of any type suitable for operating in accordance with the techniques described herein. While controller 29 is illustrated as a single unit, it is understood that controller 29 can be entirely or partially disposed across one or more circuit boards. In some examples, controller 29 can be implemented as a plurality of discrete circuitry subassemblies.

Drive 26 is connected to motor 24 to be driven by motor 24. Drive 26 receives the rotational output from motor 24 and converts that rotational output from motor 24 into a linear input along the common axis CA. Drive 26 is connected to fluid displacement member 34 (directly or indirectly) to drive reciprocation of fluid displacement member 34 along the common axis CA. In some examples, motor 24, drive 26, and fluid displacement member 34 are disposed coaxially on the common axis CA. As such, the rotational axis of motor 24 and the reciprocation axis of fluid displacement member 34 are coaxial. Fluid displacement member 34 reciprocates within pump body 36 to pump spray fluid from reservoir 20 to spray gun 16 through supply line 18. The fluid displacement member 34 can be cylindrical, elongate along, and coaxial with the common axis CA. In some examples, fluid displacement member 34 can be a piston, which can be elongate along and coaxial with the common axis CA. In some examples, fluid displacement member 34 can be a diaphragm in which the center is linearly reciprocated while the circular outer periphery of the diaphragm is held in place. The diaphragm can be coaxial with common axis CA such that the center of the diaphragm linearly reciprocates on and along common axis CA.

During operation, the user can maneuver pump apparatus 12 to a desired position relative the target substrate by moving support 14, or other pumping application. For example, the user can maneuver pump apparatus 12 by tilting support frame 30 on wheels 32 and rolling pump apparatus 12 to a desired location. The pump apparatus 12 can be hand portable, meaning that a person can move the pump apparatus 12 onto, and around, job sites by hand. In some embodiments, the pump apparatus 12 is light enough that it can be picked up (e.g., less than about 31.8 kilograms (kg) (less than about 70 pounds (lbs))) and carried. In some cases, the pump apparatus 12 is wheeled to allow transport, as described above. The pump apparatus 12 can weigh less than about 45.4 kg (about 100 lbs) in some cases, or less than about 68.0 kg (about 150 lbs) in some cases, or less than about 90.7 kg (about 200 lbs) in some cases.

Displacement pump 28 can extend into reservoir 20. Motor 24 provides the rotational input to drive 26 and drive 26 provides the linear input to fluid displacement member 34 to cause reciprocation of fluid displacement member 34. The rotor of motor 24 rotates on common axis CA to generate the rotational output. The rotational output from motor 24 is provided as a rotational input to drive 26, which converts the rotational input from motor 24 to a linear output that is provided as a linear input to fluid displacement member 34. The linear input to fluid displacement member 34 from drive 26 causes linear displacement of fluid displacement member 34 on the common axis CA. Fluid displacement member 34 draws fluid from reservoir 20, pressurizes the fluid, and drives the fluid downstream through supply line 18 to spray gun 16. The user can manipulate spray gun 16 by grasping handle 38, such as with a single hand of the user. The user causes spraying by actuating trigger 40. In some examples, the pressure generated by pump apparatus 12 atomizes the fluid exiting spray gun 16 to generate the fluid spray. In some examples, spray gun 16 is an airless sprayer, meaning the pressure alone acting on the fluid and generated by pump apparatus 12 propels and atomizes the fluid while airflow is not used to propel and atomize the fluid into a spray.

FIG. 2 is a schematic block diagram of pump apparatus 12. Pump apparatus 12 includes motor 24, drive 26, and displacement pump 28. Rotor 42 and stator 44 of motor 24 are shown. Rotor 42 includes permanent magnet array 46 and rotor body 48. Stator 44 includes phase assemblies 50 that each include a coil 52. Drive 26 includes drive nut 54 and screw 56. Displacement pump 28 includes pump body 36, fluid displacement member 34, and check valves 58a, 58b.

Motor 24 is an electric motor. Rotor 42 is configured to rotate relative to stator 44 and on axis of rotation AR. Stator 44 is disposed coaxially with rotor 42 on the axis of rotation AR. The axis of rotation AR is coaxial with common axis CA. Rotor 42 includes permanent magnet array 46 oriented towards stator 44. In the example shown, rotor 42 is disposed about stator 44 and permanent magnet array 46 is disposed on a radially inner side of rotor body 48. Air gap 60 is formed between stator 44 and rotor 42 such that stator 44 and rotor 42 are not in direct contact. More specifically, the air gap is formed radially between stator 44 and permanent magnet array 46. As such, motor 24 can be considered to include an outer rotor. It is understood, however, that in various other examples the rotor 42 is disposed within stator 44 to rotate within stator 44 such that motor 24 can be considered to include an inner rotor. In such examples, permanent magnet array 46 can be disposed on an outer radial surface of rotor body 48.

Stator 44 includes phase assemblies 50 that are arrayed along and around the axis of rotation AR. Each phase assembly 50 includes a coil 52 extending circumferentially about the common axis CA. The phase assemblies 50 include metallic components formed on each axial side of the coil 52 of that phase assembly 50. The metallic components can be formed wholly or partially from stacks of laminations. Laminations can be formed from material which is readily susceptible to polarization from the fields generated by coils 52. Such material is typically ferromagnetic. The ferromagnetic materials can be metal such as iron or an alloy of iron, such as steel. More specially, laminations can be formed from silicon steel, among other options. Ferromagnetic material can be a ceramic doped or otherwise embedded with ferromagnetic elements.

The coils 52 are formed as hoops of wire that extend circumferentially about the common axis CA. The coils 52 are thus coaxial with the common axis CA. Each of the coils 52 is discrete with respect to the other ones of the coils 52. Each coil 52 is a winding of wire, typically copper, around the common axis CA. Thus, each coil 52 could be a continuous winding of 20, 30, 40, 50, 100, or less or more loops around the common axis CA. In some embodiments, a ribbon is wound instead of a wire. Each coil 52 has two termination wires representing the ends of the circuit of each coil 52 for running an AC signal through the coil 52, which can electrically connect with the controller 29 (FIGS. 1A and 1B).

The coils 52 do not radially overlap or crossover each other. No part of any one of the coils 52 is disposed at the same axial location along the common axis CA as any other one of the coils 52. As such, none of the coils 52 circumferentially overlaps with any of the other coils 52. There is an axial gap between each of the coils 52 of the motor 24. The coils 52 are thus located at separate and distinct axial positions along the common axis CA. Each coil 52 is made from circular loops of wire. The common axis CA extends through each loop of each coil 52. The coils 52 do not include loops wherein the common axis CA does not extend through such loop. The wire of the loops does not extend axially but instead extends circumferentially about the common axis CA.

Displacement pump 28 is disposed at an opposite axial end of pump apparatus 12 from motor 24. Fluid displacement member 34, such as a piston or diaphragm among other options, is configured to reciprocate on reciprocation axis RA. The reciprocation axis RA is coaxial with common axis CA. The reciprocation axis RA is also coaxial with the axis of rotation AR. Fluid displacement member 34 reciprocates within pump body 36 to pump fluid. Both pump body 36 and fluid displacement member 34 can be coaxial with common axis CA. In some examples, pump body 36 is a cylinder. For example, pump body 36 can be a cylinder and fluid displacement member 34 can be a piston axially elongate along the reciprocation axis RA, both of which are disposed coaxially on common axis CA with rotor 42 and stator 44.

Drive 26 extends between and connects motor 24 and fluid displacement member 34. In the example shown, drive 26 includes screw 56 and drive nut 54. The elongate screw 56 is coaxial with the common axis CA and is thus coaxial with the reciprocation axis RA and the axis of rotation AR. The elongate screw 56 can one of rotate on the common axis CA while not linearly reciprocating or the elongate screw 56 can linearly reciprocate along the common axis CA while not rotating, depending on the mechanical design of pump apparatus 12. The drive nut 54 is coaxial with the common axis CA and is thus coaxial with the reciprocation axis RA and the axis of rotation AR. The drive nut 54 can one of rotate on the common axis CA in an embodiment where the screw 56 linearly reciprocates or can reciprocate along the common axis CA in an embodiment where the screw 56 rotates on the common axis CA but does not linearly reciprocate.

The rotating component of drive 26 (e.g., a first one of drive nut 54 and screw 56) is connected to rotor 42 to receive the rotational output from motor 24. The reciprocating component of drive 26 (e.g., the other one of drive nut 54 and screw 56) is connected to fluid displacement member 34 to provide a linear input to fluid displacement member 34 to drive axial reciprocation of the fluid displacement member 34.

At least a portion of the drive 26 is disposed axially between motor 24 and displacement pump 28, but it is understood that one or more components of drive 26 can radially overlap with one or more components of motor 24. Components can be considered to radially overlap when those components are disposed at common axial locations along common axis CA. A radial line extending from common axis CA will extend through each of the radially overlapping components. For example, the drive nut 54 can be radially inside of the rotor 42 (particularly in embodiments in which the rotor 42 resides within, and rotates within the stator 44) to drive the screw 56 linearly. In some examples, the screw 56 is at least partially disposed within a hollow core of the motor 24 (the hollow core extending through the rotor 42 and coaxial with the rotor 42 and the common axis CA). In some examples, an amount of overlap between the motor 24 and the linearly displacing element of the drive 26 can vary during operation. For example, an axial end of the screw 56 can be disposed within the motor 24 and move axially along the common axis CA relative to the motor 24 such that an amount of overlap increases and decreases. As such, at least a portion of the reciprocation area of the reciprocating components, which is the area along the common axis between the distal ends of the extent of linear travel of the reciprocating components, can be both coaxial with and co-located with at least a portion of the rotor area of the axis of rotation, which is the area along the axis of rotation at which the rotor 42 is located.

During operation, power is provided to coils 52 and phase assemblies 50 generate electromagnetic fields that interact with the permanent magnet array 46 to drive rotation of rotor 42. The embodiment of the motor 24 shown includes three phases corresponding to the three phase assemblies 50 and the coils 52 therein in which three sinusoidal AC signals are delivered through the coils 52, 120-degrees electrically offset. If there were two phase assemblies 50 and two coils 52, then the two sinusoidal AC signals would be 180 degrees apart, or 90 degrees apart for sets of four phase assemblies 50, etc.

Rotor 42 rotates on common axis CA and generates the rotational output. The rotational output is provided to drive 26, which converts the rotational motion into linear motion along common axis CA. The linear output generated by the drive 26 is provided to the fluid displacement member 34 to cause the fluid displacement member 34 to displace linearly on common axis CA. In some examples, motor 24 is a reversible motor such that rotor 42 is driven in a first rotational direction (e.g., one of clockwise and counterclockwise) to displace fluid displacement member 34 in first axial direction AD1 and rotor 42 is driven in a second rotational direction (e.g., the other of clockwise and counterclockwise) to displace fluid displacement member 34 in second axial direction AD2.

In the example shown, displacement pump 28 is a double displacement pump that is configured to output fluid both when fluid displacement member 34 is driven in first axial direction AD1 and when fluid displacement member 34 is driven in second axial direction AD2. In the example shown, fluid displacement member 34 is a piston and check valve 58b is mounted to the piston to travel axially with the piston. As fluid displacement member 34 moves in second axial direction AD2, check valve 58a opens and check valve 58b closes. Fluid is drawn into an upstream chamber of pump body 36, which chamber is disposed axially between check valve 58a and check valve 58b, through check valve 58a. Fluid in a downstream chamber, located on an opposite axial side of check valve 58b from the upstream chamber, is driven downstream from displacement pump 28. As fluid displacement member 34 moves in first axial direction AD1, check valve 58a closes and check valve 58b opens. Retrograde flow out of the upstream chamber is prevented by the closed check valve 58a. Fluid is driven from the upstream chamber, through check valve 58b, and into the downstream chamber. Fluid is also driven downstream from displacement pump 28 out of the downstream chamber. As such, displacement pump 28 can output fluid during each of the strokes of fluid displacement member 34.

Traditional AC induction motors use a plurality of discrete coils that extend axially and form an array of coils extending circumferentially around the axis of rotation of the rotor (See FIGS. 10A-10B). Each coil represents a potential pole for acting on a magnet. The discrete coils arrayed circumferentially around the axis of rotation in a conventional AC induction motor are out of phase with respect to each other. The potential torque generated is proportional to the number of poles. The number of poles in such a motor is limited by the ability to fit discrete coils circumferentially around the axis of rotation within the motor.

Coils 52 that extend all the way circumferentially around the common axis CA allow for many more poles than traditional AC induction motors, and more poles allows the generation of forces to be spread more evenly about the circumference of the rotor 42, to minimize off-center forces or eliminate unproductive parts of forces. Co-locating the axis of rotation AR of rotor 42 with the axis of reciprocation RA of the displacement member 34 on a common axis CA further minimizes off-center forces. The high pole count eliminates or reduces the need for reduction gearing, further reducing off-center forces as well as reducing weight and friction, allowing for a more compact arrangement of pump apparatus 12. The present motor 24 design facilitates high torque generating high fluid pressure even at low pumping speed with minimal or no gearing reduction, again reducing cost, weight, friction, and package size. Having the axis of rotation of the rotor 42, the elongate screw 56, and the displacement member 34 all be coaxial with respect to each other (e.g., along the common axis CA) allows for a compact and efficient pump design.

There is no mechanical amplification (mechanically decrease speed to increase torque) between the rotational output of the motor 24 and the linear reciprocating input to the displacement pump 28. While the motor 24 can develop high torque at low speeds, unlike a traditional AC induction motor, the present motor 24 can also develop high torque at high speeds. Therefore, a single pump apparatus 12 can achieve many performance points (e.g., pressure to volume pumped) across a performance range that would have otherwise required several different models of conventional motor-driven-pumps with specific gear reductions each specific to a subpart of the same performance range. Pump apparatus 12 thereby provides a wide range of possible operating conditions that would require multiple traditional pumps each having different drives to achieve the same range.

Figure 3A:
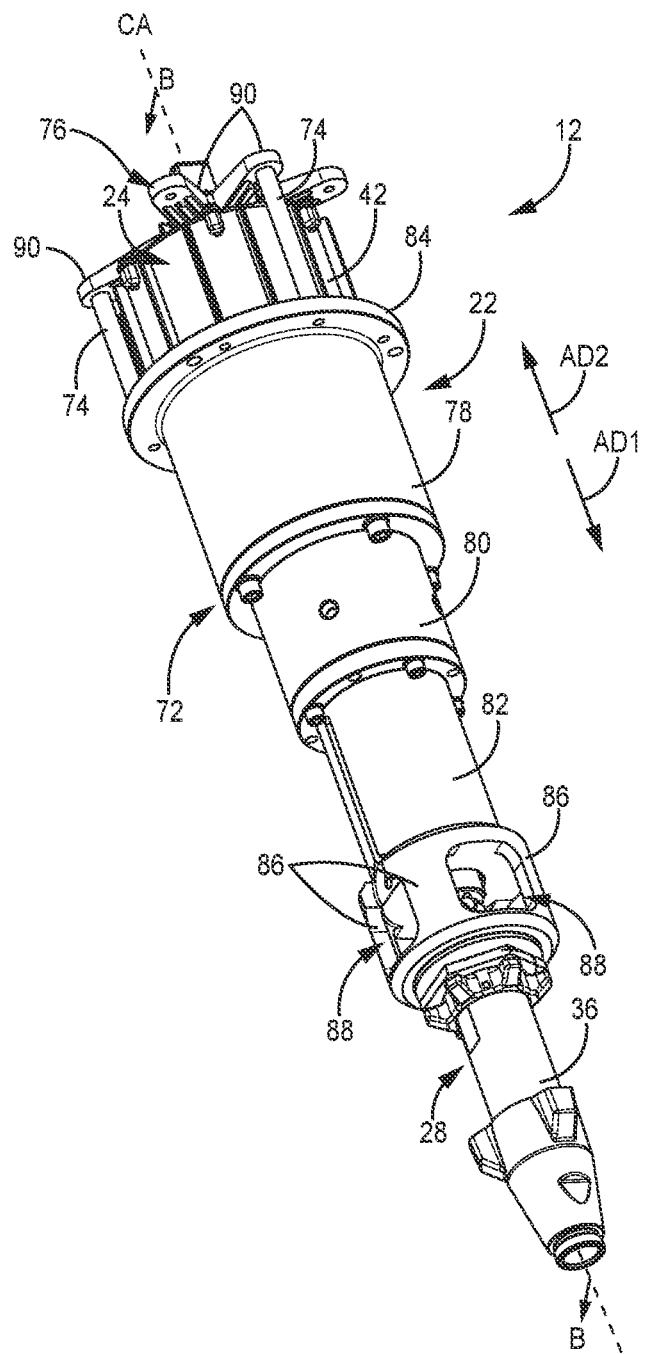
FIG. 3A is an isometric view of a pumping assembly for use in the pump system of FIGS. 1A and 1B.
Figure 3B:
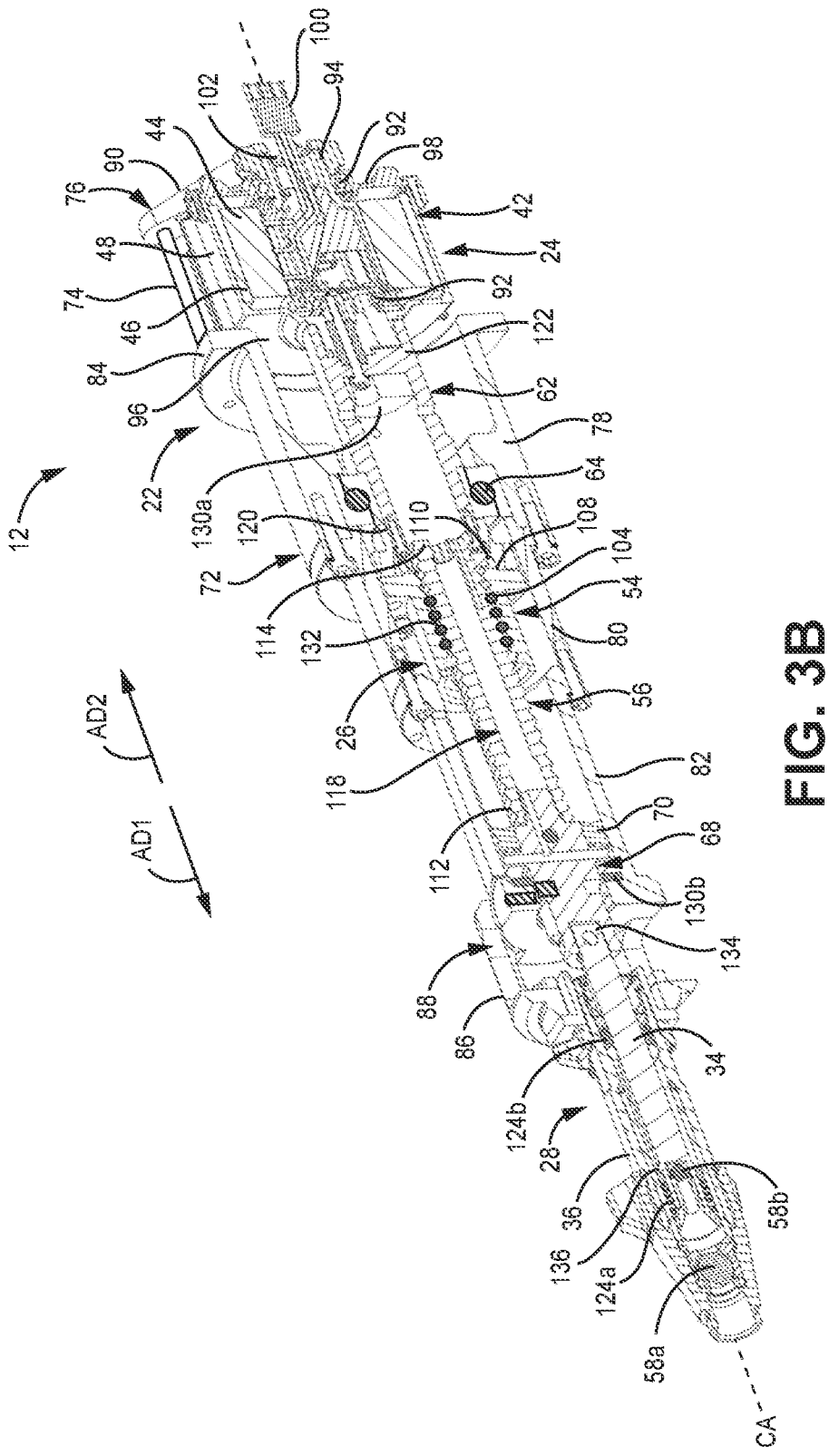
FIG. 3B is an isometric cross-sectional view taken along line B-B in FIG. 3A.
Figure 3C:
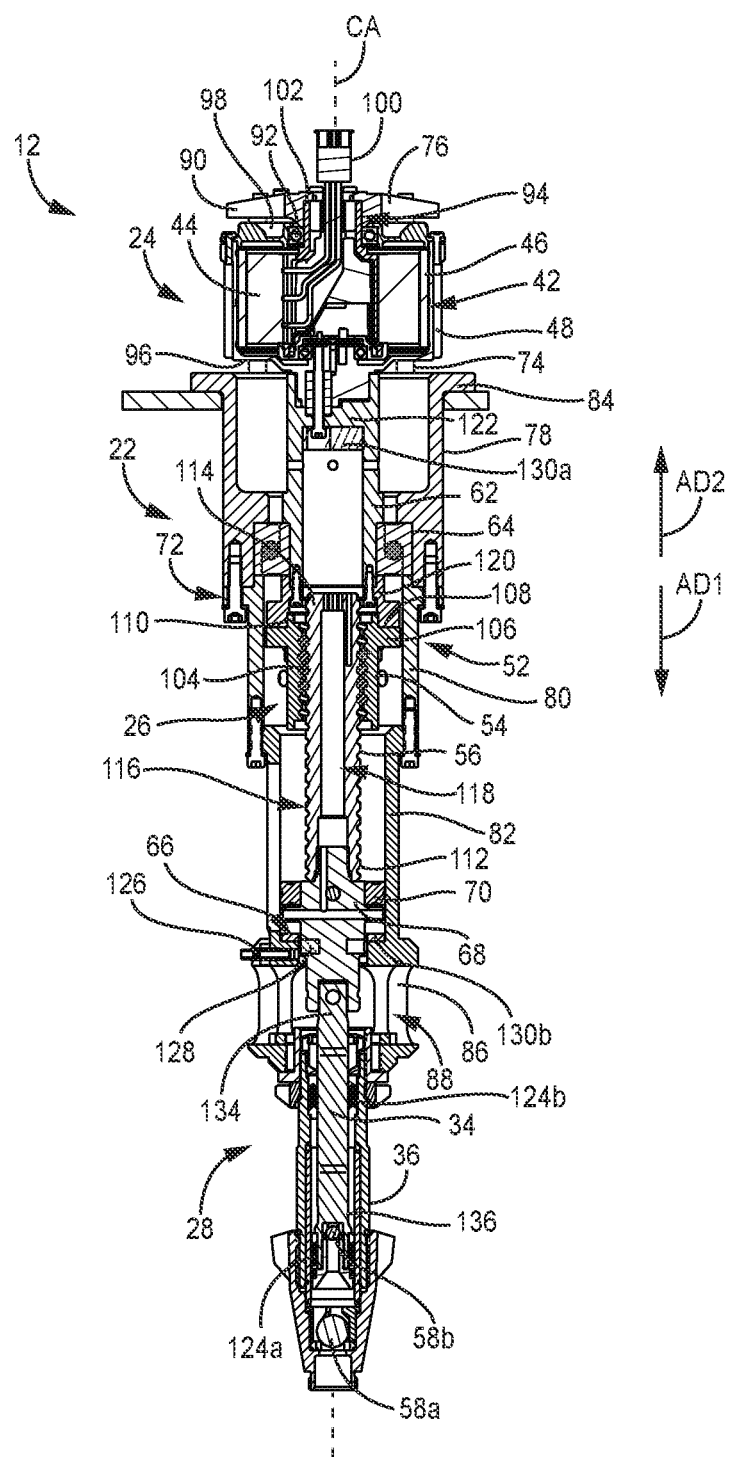
FIG. 3C is a first elevational cross-sectional view taken along line B-B in FIG. 3A.

FIG. 3A is an isometric view of pump apparatus 12. FIG. 3B is an isometric cross-sectional view of pump apparatus 12 taken along line B-B in FIG. 3A. FIG. 3C is an elevational cross-sectional view taken along line B-B in FIG. 3A. FIGS. 3A-3C will be discussed together. Pump frame 22, motor 24, drive 26, displacement pump 28, rotor shaft 62, bearing assembly 64, sensor 66, pump shaft 68, and clocking member 70 are shown. Pump frame 22 includes main body 72, connectors 74, and frame end 76. Main body 72 includes first portion 78, second portion 80, third portion 82, mounting flange 84, posts 86, and side openings 88. Frame end 76 includes radial projections 90.

Motor 24 includes rotor 42, stator 44, motor bearings 92, axle 94, first motor end 96, second motor end 98, and power connector 100. Rotor 42 includes rotor body 48 and permanent magnet array 46. Internal details of the stator 44 and rotor 42 will be discussed further herein. Axle 94 includes outer end 102.

Drive 26 includes drive nut 54, screw 56, and rolling elements 104 (FIG. 2B). Drive nut 54 includes nut mounting projection 106, nut shoulder 108, and axial extension 110. Screw 56 includes first screw end 112, second screw end 114, screw thread 116, and bore 118. Rotor shaft 62 includes first shaft end 120 and second shaft end 122.

Displacement pump 28 includes fluid displacement member 34, pump body 36, and check valves 58a, 58b. Fluid displacement member 34 includes connector 108. Sensor 66 includes first transducer component 126 and second transducer component 128.

Motor 24 is disposed at a first axial end of pump apparatus 12 and displacement pump 38 is disposed at a second axial end of pump apparatus 12. Pump frame 22 supports other components of pump apparatus 12. Motor 24 is disposed axially between frame end 76 and main body 72. Motor 24 is an electric motor 24. Stator 44 includes coils 52 (shown in FIGS. 2 and 4A-9), which can also be referred to as stator windings, and rotor 42 includes permanent magnet array 46. Stator 44 and rotor 42 are disposed coaxially on the common axis CA. Rotor 42 is configured to rotate about common axis CA in response to current through stator 44. Motor 24 is a reversible motor in that stator 44 can cause rotation of rotor 42 alternately in two rotational directions about common axis CA (e.g., clockwise or counterclockwise) to cause linear travel of fluid displacement member 34 alternately in forward or rearward directions along the common axis CA (e.g., in axial direction AD1 and axial direction AD2). For example, rotor 42 can rotate in one of the clockwise and counterclockwise directions to drive fluid displacement member 34 through a downstroke in axial direction AD1 and away from motor 24, and rotor 42 can then rotate in the other one of the clockwise and counterclockwise directions to pull fluid displacement member 34 through an upstroke in second axial direction AD2 and towards motor 24.

In the example shown, rotor 42 is disposed about stator 44 such that motor 24 includes an outer rotator. In various other embodiments, the rotor 42 is disposed within the stator 44 such that motor 24 includes an inner rotator, which is still consistent with the principles of the present disclosure. Permanent magnet array 46 faces stator 44 and is spaced from stator 44 by an air gap 60 (best seen in FIG. 2). In the example shown, permanent magnet array 46 is disposed on an inner circumferential face of rotor body 48 as rotor 42 is an outer rotator. Permanent magnet array 46 is arrayed circumferentially about common axis CA. Permanent magnet array 46 forms an annular array that is disposed coaxially on common axis CA with rotor 42 and stator 44. Rotor body 48 can be formed from a single component or from multiple components fixed together.

Stator 44 is fixed to axle 94. Axle 94 extends along and is disposed coaxially with common axis CA. Outer end 102 of axle 94 extends in second axial direction AD2 beyond an axial end of stator 44. Outer end 102 of axle 94 extends in second axial direction AD2 beyond an axial end of rotor 42. Outer end 102 projects axially beyond second motor end 98. Outer end 102 of axle 94 is open such that electric power is provided to motor 24 through second motor end 98. In the example shown, power connector 100, which can be an electric plug configured to connect to an outlet such as a wall socket, is connected to stator 44 by electric cables extending through the opening in outer end 102 and to the coils 52 of stator 44. As such, motor 24 can receive power through second motor end 98 and provide a rotational output through first motor end 96. Motor bearings 92 support rotor 42 relative to stator 44. Motor bearings 92 facilitate rotation of rotor 42 relative to stator 44. Axle 94 extends through the motor bearing 92 disposed at second motor end 98 of motor 24, such that the motor bearing 92 at second motor end 98 is disposed between rotor body 48 and axle 94.

Pump frame 22 supports motor 24. Main body 72 extends in axial direction AD1 relative to motor 24. In the example shown, main body 72 is spaced axially from first motor end 96. Main body 72 is spaced in first axial direction AD1 from first motor end 96. Main body 72 is disposed coaxially with common axis CA. As such, main body 72 is disposed coaxially with motor 24 and with fluid displacement member 34 on common axis CA. Main body 72 includes a first portion 78 that is axially closest to motor 24, a second portion 80 that is connected to first portion 78 and extends in first axial direction AD1 from first portion 78, and a third portion 82 that is connected to second portion 80 and extends in first axial direction AD1 from second portion 80. While main body 72 is shown as formed by three portions, it is understood that main body 72 can be formed by as many or as few portions as desired. In the example shown, the width of each portion forming main body 72 taken orthogonal to the common axis CA reduces as main body 72 extends away from motor 24 and towards displacement pump 28. In the example shown, first portion 78 has a larger width than second portion 80, second portion 80 has a larger width than third portion 82, and third portion 82 has a larger width than pump body 36. Posts 86 and side openings 88 are formed in an end of third portion 82 opposite second portion 80. Side openings 88 are formed between posts 86. Side openings 88 provide access to the connection between fluid displacement member 34 and pump shaft 68 to facilitate mounting and dismounting of displacement pump 28.

Main body 72 being formed from multiple portions facilitates efficient assembly and servicing of pump apparatus 12. Main body 72 can be disassembled to provide access to various components of pump apparatus 12, including dynamic, moving components. For example, second portion 80 can be removed from first portion 78 to facilitate lubrication of drive 26. It is understood that, in some examples, drive 26 can be accessed and serviced without disassembling main body 72. Bumper 130b is disposed in third frame body 62 on an opposite side of pump shaft 68 from drive nut 54. Bumper 130b can be compressible and can interface with pump shaft 68 in case of overtravel.

Frame end 56 is disposed on an opposite axial side of motor 24 from main body 72. Frame end 76 is disposed proximate second motor end 98. Frame end 76 is fixed to outer end 102 of axle 94. Motor 24 is statically connected to pump frame 22 by the connection of axle 94 and frame end 76. Pump frame 22 fixes motor 24 at an axial location along the common axis CA and prevents stator 44 from moving relative to the common axis CA by the connection of pump frame 22 and axle 94.

Connectors 74 extend between main body 72 and frame end 76 and fix main body 72 and frame end 76 together to prevent relative movement between frame end 76 and main body 72. In the example shown, connectors 74 are fixed to radial projections 90 of frame end 76 and to mounting flange 84 of main body 72. Connectors 74 fix main body 72 and frame end 76 together to prevent undesired relative movement between those components and undesired movement of those components relative to common axis CA. While pump frame 22 is described as formed from multiple parts, it is understood that pump frame 22 functions as a single part to support motor 24 and displacement pump 28 and to react loads experienced during pumping, as discussed in more detail below. Pump frame 22 can be formed from as many or as few individual parts as desired.

Connectors 74 are spaced radially from rotor 42 and extend axially between frame end 76 and main body 72. Rotor 42 rotates within an area defined by connectors 74, main body 72, and frame end 76. While connectors 74 are shown as formed from a plurality of connecting members spaced circumferentially about rotor 42, it is understood that, in some examples, connectors 74 can fully enclose rotor 42. For example, one or more connector 74 can form a housing shell within which rotor 42 rotates. In the example shown, connecting member 74 includes a plurality of tie rods extending between and connecting frame end 76 and main body 72.

Rotor 42 and rotor shaft 62 function as a rotational output component of motor 24 that powers drive 26. Rotor shaft 62 is fixed to rotor 42 to rotate with rotor 42. Rotor shaft 62 rotates on the rotational axis of rotor 42 and thus rotates on common axis CA. Rotor shaft 62 extends into an interior of main body 72 such that at least a portion of rotor shaft 62 overlaps radially with at least a portion of main body 72. In some examples, rotor shaft 62 can be removably connected to rotor 42, such as by fasteners. It is understood that, in other examples, rotor shaft 62 can be formed integrally with rotor body 48. Rotor shaft 62 extends axially from rotor 42 along common axis CA and in first axial direction AD1. Rotor shaft 62 is elongate along an axis coaxial with the common axis CA. Rotor shaft 62 is disposed coaxially with stator 44, rotor 42, drive 26, and fluid displacement member 34. In the example shown, rotor shaft 62 includes a first axial end 102 that is open and a second axial end 104 that is closed. The closed end is disposed at the interface between rotor shaft 62 and rotor 42. Bumper 130a is disposed in rotor shaft 62 at the closed end of rotor shaft 62. Bumper 130a can be compressible and can interface with second screw end 114 in case of overtravel to prevent damage to screw 56.

Bearing assembly 64 is disposed radially between rotor shaft 62 and pump frame 22. More specifically, bearing assembly 64 is disposed radially between rotor shaft 62 and main body 72. Bearing assembly 64 is disposed axially between drive nut 54 and motor 24. Bearing assembly 64 supports motor 24 relative pump frame 22 and facilitates rotation of rotor shaft 62 relative to pump frame 22. Bearing assembly 64 thereby forms a dynamic connection between motor 24 and pump frame 22. Bearing assembly 64 is configured to support both rotational and axial loads generated during pumping. Bearing assembly 64 supports the axial loads to isolate motor 24 from the axial loads generated by displacement pump 28. Bearing assembly 64 can be referred to as a thrust bearing.

Bearing assembly 64 can be of any configuration suitable for supporting axial loads generated during pumping. In some examples, bearing assembly 64 can include a single bearing element configured to support axial loads in each of first axial direction AD1 and second axial direction AD2, such as a double row angular contact bearing, among other options. In some examples, bearing assembly 64 can be formed from multiple bearing elements to support axial loads in each of first axial direction AD1 and second axial direction AD2. For example, bearing assembly 64 can be formed by a first tapered roller bearing configured to support axial loads in first axial direction AD1 and a second tapered roller bearing configured to support axial loads in second axial direction AD2.

Drive 26 is coaxial with the common axis CA and operably connected to rotor shaft 62. Drive 26 is disposed at an opposite axial end of rotor shaft 62 from rotor 42. Drive 26 receives a rotational output from rotor 42, via rotor shaft 62 in the example shown, and is configured to provide a linear input to fluid displacement member 34. Drive 26 is supported by pump frame 22 via bearing assembly 64. Drive 26 is located directly axially between motor 24 and displacement pump 28.

Drive nut 54 of drive 26 is connected to rotor shaft 62 to be driven by rotor shaft 62 to rotate on common axis CA. Drive nut 54 can be attached to rotor shaft 62 via fasteners (e.g., bolts), adhesive, or press-fitting, among other options.

In the example shown, nut mounting projection 106 facilitates mounting of drive nut 54 to rotor shaft 62. Fasteners can extend through nut mounting projection 106 into rotor shaft 62. First axial end 120 interfaces with nut shoulder 108 formed on drive nut 54. Nut shoulder 108 is formed between nut mounting projection 106 and axial extension 110, which axial extension 110 extends into and radially overlaps with rotor shaft 62. Screw 56 is disposed radially within drive nut 54. Screw 56 and drive nut 54 are disposed coaxially with the common axis CA.

Rolling elements 104 are disposed between screw 56 and drive nut 54 and support screw 56 relative drive nut 54. Rolling elements 104 are arrayed around, and are arrayed along, an axis that is coaxial with common axis CA. Rolling elements 104 circumferentially define a receiving area within which a portion of the screw 56 is disposed throughout operation. The screw 56 extends axially out of both ends of the receiving area. The receiving area can be cylindrical and is coaxial with the common axis CA and the axes of reciprocation of the fluid displacement member 34 and of rotation of the rotor 42. Rolling elements 104 support screw 56 within drive nut 54 such that a radial gap 132 is formed between screw 56 and drive nut 54 and is maintained by the rolling elements 104 that roll between the screw 56 and drive nut 54. Maintaining the gap 132 prevents screw 56 and drive nut 54 from directly contacting one another. Rolling elements 104 engage the thread 116 of screw 56 to exert an axial driving force on screw 56 to cause screw 56 to translate axially along the common axis CA. Rolling elements 104 can be of any suitable configuration for supporting drive nut 54 relative to screw 56 and for driving screw 56 linearly due to rotation of drive nut 54. For example, rolling elements 104 can be balls or axially elongate rollers. The ball can engage a thread of the nut 54 and the thread 116. The axially elongate rollers can include threaded shafts that engage the thread 116 to drive screw 56. The rolling elements 104 are circumferentially arrayed around the common axis CA.

In the example shown, screw 56 is configured to reciprocate along the common axis CA during operation. Rotation of drive nut 54 causes rolling elements 104 to exert an axial driving force on screw 56 to drive screw 56 linearly along common axis CA. Screw 56 provides the linear output from drive 26 to displacement pump 28. While screw 56 is described as reciprocating along the common axis CA, it is understood that, in some examples, screw 56 is configured to rotate on the common axis CA to drive linear displacement of fluid displacement member 34. For example, a nut can be connected to screw 56 to displace linearly along screw 56 due to rotation of screw 56. In such an example, screw 56 can be directly connected to or formed as part of rotor shaft 62. Further, while the screw 56 is shown as being outside of the motor 24 in this embodiment, the screw 56 can translate into the motor 24 in some embodiments. For example, the drive nut 54 and rolling elements 104 can be radially inside of the rotor 42 (particularly in embodiments in which the rotor 42 resides within, and rotates within the stator 44) to drive the screw 56 extending through a hollow core of the motor 24 (the hollow core extending through the rotor 42 and coaxial with the rotor 42 and the common axis CA). In another embodiment, the drive nut 54 and rolling elements 104 are not radially overlapped by the rotor 42, but the screw 56 extends into the hollow core of the motor 24 (e.g., the end of the screw backs up into and translates through and within the hollow core of the motor 24). As such, in some examples, the linear displacing element of drive 26 (e.g., screw 56) radially overlaps with the motor 24 during at least a portion of a pump cycle while the rotating component of drive (e.g., nut 54) does not radially overlap with the motor 24. In each case, the hollow core and screw 56 are coaxial with the common axis CA.

Pump shaft 68 is connected to screw 56 and fluid displacement member 34. Pump shaft 68 is disposed coaxially with motor 24 and fluid displacement member 34 on common axis CA. Pump shaft 68 is disposed coaxially with screw 56, drive 54, and rotor shaft 62 on common axis CA. Pump shaft 68 is connected to screw 56 to reciprocate along common axis CA. In the example shown, pump shaft 68 reciprocates with screw 56. It is understood that, in examples where screw 56 rotates rather than reciprocates, pump shaft 68 can be connected to screw 56 to reciprocate along screw 56.

Pump shaft 68 is connected to fluid displacement member 34 to drive reciprocation of fluid displacement member 34. As such, screw 56 and pump shaft 68 can be considered to form a linear displacement element of drive 26. In the example shown, a mounting portion of pump shaft 68 extends into a bore 118 within screw 56. Pump shaft 68 can be connected to screw 56 in any desired manner, such as by interfaced threading, a pin, press-fit, adhesive, or snap lock, among other options. While pump shaft 68 and screw 56 are described as separately formed, it is understood that screw 56 and pump shaft 68 can be formed as a single component. In some examples, fluid displacement member 34 can be directly connected to screw 56 and clocking member 70 can also be mounted to screw 56.

Clocking member 70 is disposed on and supported by pump shaft 68. Pump shaft 68 and clocking member 70 can be considered to form a clocking assembly to prevent rotation of the linear displacing elements of drive 26 about common axis CA. In the example shown, the clocking assembly prevents rotation of screw 56 to cause screw 56 to instead displace linearly. Pump shaft 68 forms a support of the clocking assembly as pump shaft 68 supports clocking member 70. Clocking member 70 reciprocates with screw 56 and pump shaft 68. Clocking member 70 is clocked to and interfaces with main body 72 such that the clocking assembly is prevented from rotating about common axis CA. For example, a projection formed on one of clocking member 70 and main body 72 can interface with a groove formed on the other of clocking member 70 and main body 72. Clocking member 70 thereby prevents screw 56 from rotating about the common axis CA, facilitating translation of screw 56 along the common axis CA. In some examples, the outer surface of clocking member 70 is closely fit to main body 72 to provide a sliding seal at the interface between clocking member 70 and main body 72. The sliding seal interface prevents dust and other contaminants from migrating through main body 72 to drive 26. In examples where screw 56 rotates about common axis CA, clocking member 70 can be associated with the nut configured to translate along screw 56 to prevent rotation of the nut about common axis CA.

Sensor 66 is configured to sense an end of a pump stroke in the first axial direction AD1 and/or the linear and/or rotational position of the moving elements of pump apparatus 12. A first transducer component 126 can be mounted in a bore of pump frame 22 and a second transducer component 128 can be mounted in a bore of pump shaft 68, among other options. Sensor 66 can generate and provide data to a controller 29 of motor 24 based on the locations of linearly and/or rotationally displacing elements. In the example shown, sensor 66 is configured to generated date indicating when the linearly displacing elements are at the end of a downstroke, which can be associated with a home position. In some examples, motor 24 is homed on power up. For example, rotor 42 can be driven in a first rotational direction associated with the downstroke until first transducer component 126 senses second transducer component 128, indicating the end of the downstroke. The rotor 42 can then be controlled to rotate a set number of revolutions associated with a stroke to cause subsequent upstrokes and downstrokes. In some examples, motor 24 is rehomed during operation to prevent creep, such as after a predetermined number of pump cycles or pump strokes. In some examples, a sensor can be integrated into the motor 24 to sense the angular position of the rotor 42 for control and signal timing purposes. For example, a second sensor associated with motor 24 can generate data regarding revolutions of rotor 42 and provide that data to controller 29. First transducer component 126 and second transducer component 128 can be of any desired configuration. For example, one of first transducer component 126 and second transducer component 128 can be a magnet while the other of first transducer component 126 and second transducer component 128 can be a magnetic reed switch sensitive to the magnetic field generated by the magnet. The magnet component can be mounted to either of pump frame 22 and pump shaft 68 and the magnetic field sensor can be mounted to the other one of the components.

Displacement pump 28 is mounted to pump frame 22 and disposed on the common axis CA. More specifically, pump body 36 is mounted to an end of pump frame 22 opposite motor 24. Pump body 36 is fixedly mounted to pump frame 22. Pump body 36 is fixed to pump frame 22 such that pump body 36 remains stationary during operation and does not move relative to common axis CA. Pump body 36 can be cylindrical about an axis coaxial with common axis CA. Pump body 36 can thereby be elongate along an axis coaxial with the axis of rotation of rotor 42.

Fluid displacement member 34 is at least partially disposed within pump body 36. In the example shown, fluid displacement member 34 is elongate along an axis coaxial with the common axis CA. In the example show, fluid displacement member 34 is a piston configured to pump the fluid by reciprocating along the common axis CA. It is understood, however, that fluid displacement member 34 can be of any desired configuration suitable for pumping while being coaxially disposed with common axis CA. For example, fluid displacement member 34 can be a diaphragm with a center disposed on and configured to reciprocate along common axis CA. While fluid displacement member 34 is described as reciprocating along common axis CA in this example, it is understood that some examples of fluid displacement member 34 can rotate on common axis CA without reciprocating.

Fluid displacement member 34 is axially elongate between first end 134 and second end 136. First end 134 of fluid displacement member 34 is connected to linearly displacing drive elements of pump apparatus 12. In the example shown, first end 134 of fluid displacement member 34 is directly connected to an axial end of pump shaft 68 opposite screw 56. In the example shown, first end 134 of fluid displacement member 34 extends into pump shaft 68. First end 134 is secured to pump shaft 68 such that fluid displacement member 34 reciprocates with screw 56 and pump shaft 68 along common axis CA. First end 134 and pump shaft 68 can be connected in any desired manner. For example, a pin can extend through first axial end 134 and through pump shaft 68 to secure fluid displacement member 34 to pump shaft 68. While fluid displacement member 34 is described as directly connected to pump shaft 68, it is understood that fluid displacement member 34 can be directly connected to other linearly displacing elements of drive 26. In some examples, fluid displacement member 34 can be directly connected to screw 56.

Displacement pump 28 is statically connected to pump frame 22 by the connection between pump body 36 and main body 72. The static connection holds pump body 36 at a set location along common axis CA. The static connection prevents pump body 36 from moving relative to common axis CA. For example, the static connection prevents linear movement along or rotational movement about common axis CA. Displacement pump 28 is dynamically connected to motor 24 by the connection between fluid displacement member 34 and drive 26. The dynamic connection causes fluid displacement member 34 to move relative to common axis CA. For example, the dynamic connection causes linear movement along or rotational movement about common axis CA, depending on the configuration of displacement pump 28.

Check valve 58a is a one-way valve supported by pump body 36. Check valve 58b is a one-way valve disposed in fluid displacement member 34 to reciprocate with fluid displacement member 34. In the example shown, check valve 58b is disposed at second axial end 136 of fluid displacement member 34. Displacement pump 28 can be a double displacement pump in that displacement pump 28 outputs fluid during both the upstroke in second axial direction AD2 and the downstroke in first axial direction AD1. Check valve 58a can be coaxial with the common axis CA. More specifically, both of the ball and the annular seat of the check valve 58a can be coaxial with the common axis CA. Check valve 58b can be coaxial with the common axis CA. More specifically, both of the ball and the annular seat of the check valve 58b can be coaxial with the common axis CA.

Dynamic seals 124a, 124b are disposed at interfaces between fluid displacement member 34 and pump body 36. Dynamic seal 124a divides the interior of pump body 36 into an upstream chamber and a downstream chamber. Dynamic seal 124a can be mounted to fluid displacement member 34 to move with fluid displacement member 34 or can be stationary relative to pump body 36 such that fluid displacement member 34 moves relative to dynamic seal 124a. In the example shown, fluid displacement member 34 exits from pump body 36 through dynamic seal 124b. Dynamic seal 124b is supported by pump body 36 and remains stationary relative to pump body 36 such that fluid displacement member 34 moves relative to dynamic seal 124b. Dynamic seals 124a, 124b can be formed from stacks of packing rings. Dynamic seals 124a, 124b are disposed coaxially on common axis CA and are thus coaxial with the rotational axis of rotor 42 and the reciprocation axis of fluid displacement member 34.

An example pump cycle including a downstroke and an upstroke is discussed by way of example. During operation, power is provided to stator 44 to drive rotation of rotor 42 about common axis CA. Rotor 42 rotates about common axis CA in a first rotational direction (e.g., one of clockwise and counterclockwise) and causes simultaneous rotation of rotor shaft 62 due to connection between rotor 42 and rotor shaft 62. Rotor shaft 62 rotates on common axis CA and powers drive 26 due to the connection between rotor shaft 62 and drive nut 54.

Drive nut 54 rotates on common axis CA causing rolling elements 104 to exert an axial driving force on screw 56 in second axial direction AD2 thereby driving screw 56 linearly along the common axis CA. Screw 56 is driven linearly in second axial direction AD2 and towards motor 24. In some examples, a portion of screw 56 extends into and axially overlaps with a portion of motor 24. In such examples the overlap along the common axis CA increases as screw 56 displaces in second axial direction AD2. Screw 56 pulls fluid displacement member 34 through an upstroke along the common axis CA and in second axial direction AD2. During the upstroke, check valve 58a is opened and check valve 58b is closed. The volume of the upstream chamber formed between fluid displacement member 34 and check valve 58a increases and the volume of the downstream chamber located on an opposite axial side of the dynamic interface between fluid displacement member 34 and dynamic seal 124a from the upstream chamber decreases. Fluid is drawn into the upstream chamber through check valve 58a and simultaneously driven downstream from the downstream chamber of displacement pump 28.

After completing the upstroke, rotor 42 is driven in a second rotational direction opposite the first rotational direction (e.g., the other of clockwise and counterclockwise). Rotor 42 drives rotation of rotor shaft 62, which drives rotation of drive nut 54. Rolling elements 104 exert an axial driving force in first axial direction AD1 on screw 56 to drive screw 56 linearly along the common axis CA. Screw 56 drives pump shaft 68 and thus fluid displacement member 34 through a downstroke along the common axis CA and in first axial direction AD1. During the downstroke, check valve 58a is closed and check valve 58b is opened. Fluid is driven through check valve 58b from the upstream chamber to the downstream chamber. The fluid is driven downstream from displacement pump 28. Sensor 66 can sense the end of the downstroke and provide that data to the controller 29. In the example shown, displacement pump 28 outputs fluid during both the upstroke and the downstroke.

Axial forces are generated and experienced during pumping. Bearing assembly 64 permits rotational motion to pass within drive 26 from motor 24 while preventing some or all of the axial forces generated by displacement pump 28 from transferring to rotor 42. Fluid displacement member 34 moves in a reciprocating linear fashion along common axis CA and experiences axial forces due to fluid resistance experienced during reciprocation. Specifically, fluid displacement member 34 experiences a downward reaction force when moving through the upstroke and experiences an upward reaction force when moving through the downstroke. Both the upward reaction force and the downward reaction force transfer through drive 26 and to bearing assembly 64. The coaxial nature of motor 24, fluid displacement member 34, and bearing assembly 64 facilitates efficient force transfer to protect motor 24 from the reaction forces. Bearing assembly 64 is disposed coaxially with the axis of reciprocation of fluid displacement member 34 such that the forces provided to bearing assembly 64 are balanced about the common axis CA. The bearing assembly 64 transmits such forces to the pump frame 22 to isolate motor 24. The coaxial nature facilitates a compact, efficient bearing arrangement.

The pitch of the threading on the screw 56, drive nut 54, and possibly rolling elements 104, in examples where elongate rollers are used, determines the ratio of rotor 42 rotation to fluid displacement member 34 linear travel. The rotor 42 and drive 26 are sized to provide a desired revolution to stoke ratio. In some examples, rotor 42 and drive 26 are sized such that one revolution of rotor 42 results in a full stroke of fluid displacement member 34 in one of first axial direction AD1 and second axial direction AD2. A full revolution in an opposite rotational direction results in a full stroke of fluid displacement member 34 in the opposite axial direction. As such, two revolutions in opposite directions can provide a full pump cycle of fluid displacement member 34, each pump cycle including one stroke in each axial direction (e.g., an upstroke and a downstroke). Pump apparatus 12 can thereby provide a 1:1 ratio between revolutions of rotor 42 and pump strokes.

It is understood, however, that rotor 42 and drive 26 can be sized to provide any desired revolution to stroke ratio. Pump apparatus 12 can be configured to provide any desired revolution to stroke ratio. In some examples, pump apparatus 12 provides a revolution to stroke ratio of up to about 4:1. It is understood that other maximum revolution to stroke ratios are possible, such as about 1:1, 2:1, 3:1, or 5:1, among other options. In some examples, pump apparatus 12 can provide a revolution to stroke ratio between about 0.25:1-7:1. It is understood that any of the ranges discussed can be an inclusive range such that the boundary values are included within the range. It is further understood that each of the ranges discussed can vary from the specified range while still falling within the scope of this disclosure.

It is further understood that controller 29 can control operation of motor 24 such that the actual stroke length is dynamic and can vary during operation. Controller 29 can cause the stroke length to vary between the downstroke and the upstroke. In some examples, controller 29 is configured to control operation of motor 24 between a maximum stroke length and a minimum stroke length.

Motor 24 and drive 26 can be configured to displace fluid displacement member 34 at least about 6.35 mm (about 0.25 in.) per revolution of rotor 42. In some examples, motor 24 and drive 26 are configured to displace fluid displacement member 34 between about 8.9-30.5 mm (about 0.35-1.2 in.) per revolution of rotor 42. In some examples, motor 24 and drive 26 are configured to displace fluid displacement member 34 between about 8.9-11.4 mm (about 0.35-0.45 in.). In some examples, motor 24 and drive 26 are configured to displace fluid displacement member 34 between about 19-21.6 mm (about 0.75-0.85 in.). In some examples, motor 24 and drive 26 are configured to displace fluid displacement member 34 between about 24.1-26.7 mm (about 0.95-1.05 in.). The axial displacement per revolution of rotor 42 provided by pump apparatus 12 facilitates precise control and quick responsiveness during pumping. The axial displacement per revolution of rotor 42 facilitates quick changeover between pump strokes, minimizing time when fluid displacement member 34 is not moving, and providing more efficient pumping while reducing wear on components of pump apparatus 12.

Pump apparatus 12 is configured to pump according to a revolution to displacement ratio. More specifically, motor 24 and drive 26 are configured to provide a desired revolution to displacement ratio between revolutions of rotor 42 and the linear travel distance of fluid displacement member 34, as measured in inches, for each revolution of rotor 42. In some examples, the revolution to displacement ratio (rev/in.) is less than about 4:1. In some examples, the revolution to displacement ratio is between about 0.85:1 and 3.25:1. In some examples, the revolution to displacement ratio is between about 1:1-3:1. In some examples, the revolution to displacement ratio is between about 1:1-2.75:1. In some examples, the revolution to displacement ratio between is about 1:1-2.55:1. In some examples, the revolution to displacement ratio is between about 1:1-1.3:1. In some examples, the revolution to displacement ratio is between about 0.9:1-1.1:1. In some examples, the revolution to displacement ratio is between about 2.4:1-2.6:1. The low revolution to displacement ratio provided by pump apparatus 12 relative to other electrically-powered pumps, such as crank-powered pumps that require reduction gearing to generate sufficient pumping torque and typically have revolution to displacement ratios of about 8:1 or higher, facilitates more efficient pumping, generates less wear, and provides quick responsiveness for changing stroke direction. Rotor 42 can be driven at a lower rotational speed to generate the same linear speed, thereby generating less heat during operation.

Pump apparatus 12 provides significant advantages. Motor 24 and fluid displacement member 34 are disposed coaxially on common axis CA, facilitating a compact, light-weight pumping arrangement. Motor 24 and fluid displacement member 34 being coaxial allows for quick responsiveness and control as compared to pump arrangements that include gear reduction. Motor 24 can generate high torque at low speeds and does not require reduction gearing to drive displacement of fluid displacement member 34. Motor 24 provides rotational power directly to drive 26 and drive 26 provides linear power directly to fluid displacement member 34. The rotating and reciprocating components being disposed coaxially on common axis CA facilitates efficient force transfer and even loading on common axis CA, preventing wear and increasing the operational life of pump apparatus 12.

Each of the rotating components of pump apparatus 12 (e.g., rotor 42, rotor shaft 62, and drive nut 54) are connected together to rotate together at a common rotational speed. Each of the axially displacing components of pump apparatus 12 (e.g., screw 56, pump shaft 68, and fluid displacement member 34) are connected together to linearly displace at a common axial speed. Such common speeds facilitate quick reaction and turnover as the rotational output does not have to be sped up or otherwise changed through a reduction gear train. Pump apparatus 12 thereby provides a compact, light-weight assembly suitable for pumping fluids at high pressure.

Figure 4A:
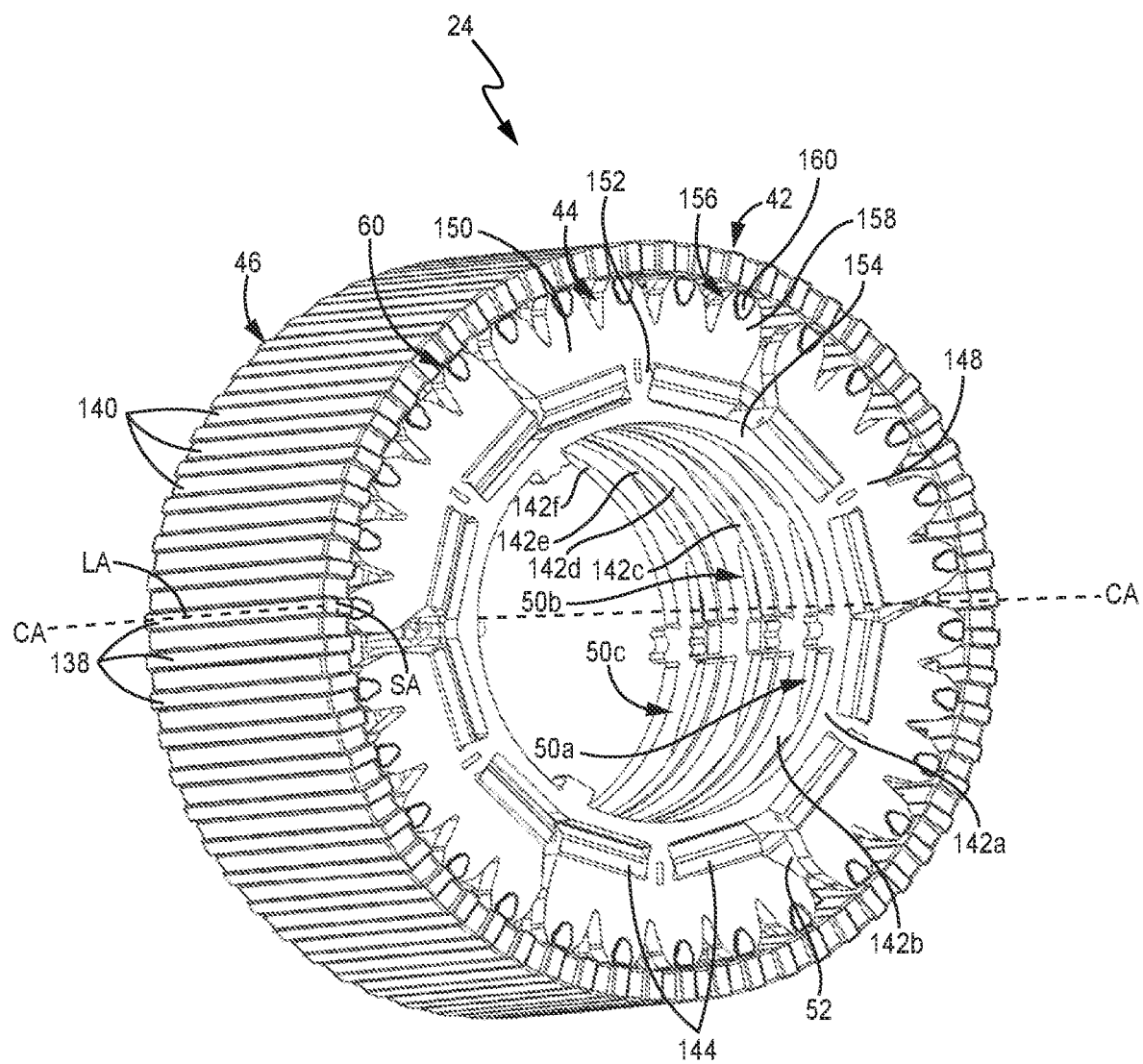
FIG. 4A is an isometric view showing parts of a motor in isolation.
Figure 4B:
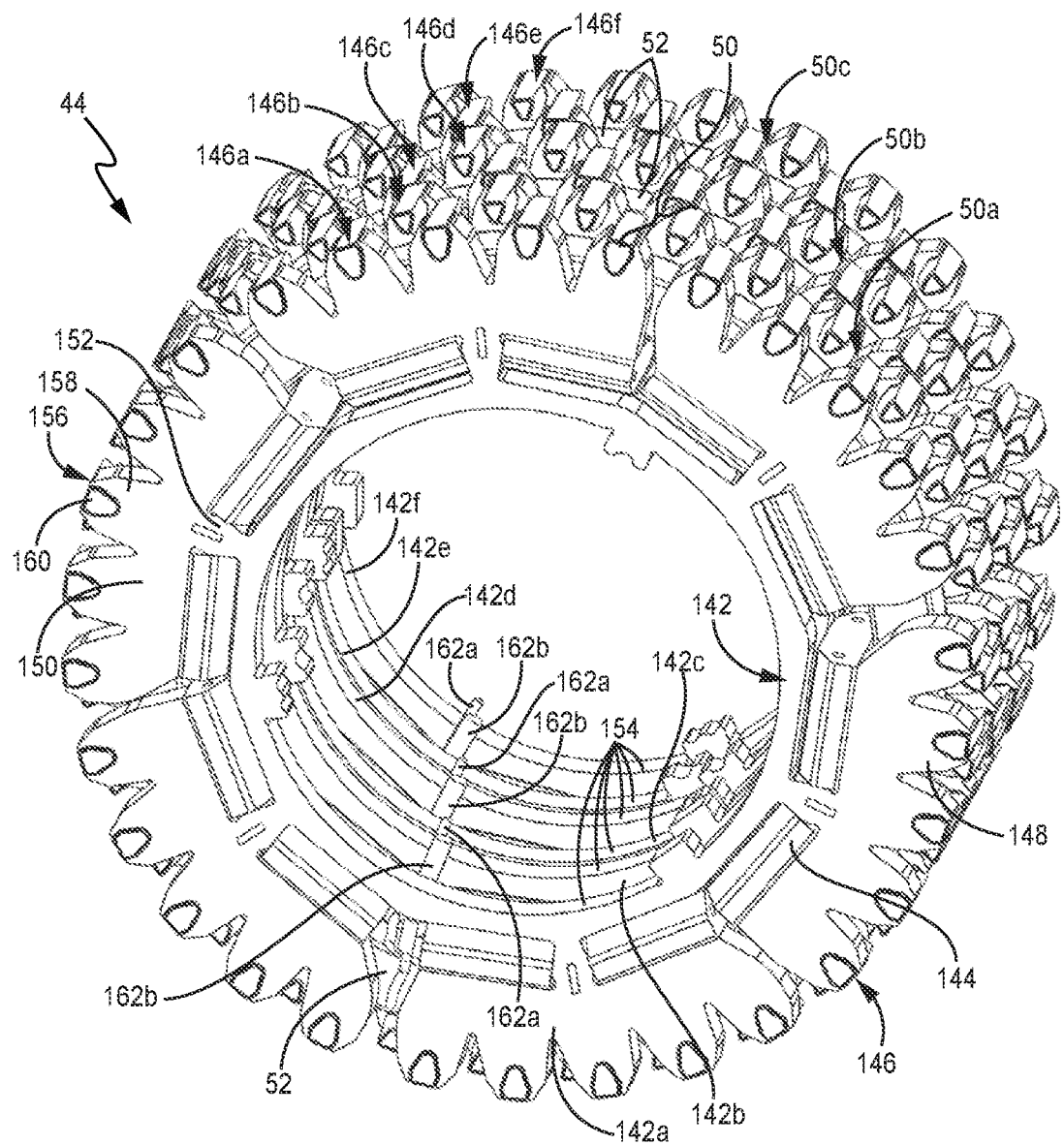
FIG. 4B is an isometric view of a stator of the motor shown in FIG. 4A.

FIG. 4A is an isometric view showing parts of motor 24 in isolation. FIG. 4B is an isometric view of stator 44. FIGS. 4A and 4B will be discussed together. The motor 24 includes a stator 44 surrounded by a rotor 42. Permanent magnet array 46 of rotor 42 is shown. Permanent magnet array 46 includes magnets 138 and concentrators 140. Stator 44 includes phase assemblies 50a-50c (collectively herein "phase assembly 50" or "phase assemblies 50"). Phase assembly 50a includes a pair of flux rings 142a, 142b; axial returns 144; and coil 52. Phase assembly 50b includes a pair of flux rings 142c, 142d; axial returns 144; and coil 52. Phase assembly 50c includes a pair of flux rings 142e, 142f; axial returns 144; and coil 52. Each flux ring 142a-142f (collectively herein "flux ring 142" or "flux rings 142") includes a circular spur array 146a-146f (collectively herein "circular spur array 146" or "circular spur arrays 146"), respectively. Each flux ring 142a-142f includes a laminate piece 148, branches 150, trunks 152, hoop 154, and plurality of spurs 156.

The motor 24 is located along the common axis CA. More specifically, the motor 24 has a cylindrical profile that is coaxial with the common axis CA. Each of the stator 44 and the rotor 42 also have cylindrical profiles coaxial with the common axis CA. The rotor 42 is driven by the stator 44 to rotate coaxially about the common axis CA. While the rotor 42 surrounds the stator 44 such that the rotor 42 rotates circumferentially around the stator 44 on the common axis CA in this embodiment, the rotor 42 may instead be located inside the stator 44 in alternative embodiments. The principles of operation of the motor 24, and the structure of the rotor 42 and stator 44, can be similar whether the rotor 42 is around the stator 44 or within the stator 44. So, while the below discussion refers to an embodiment where the rotor 42 rotates around the stator 44, the teachings equally apply to embodiments in which the rotor 42 rotates within the stator 44.

In the illustrated embodiment, the rotor 42 includes a permanent magnet array 46. The permanent magnet array 46 includes a plurality of permanent magnets 138. The plurality of magnets 138 are annularly arrayed about the common axis CA. More specifically, the tubular array of the plurality of magnets 138 is coaxial with the common axis CA. The plurality of magnets 138 are circumferentially arrayed about the common axis CA. The plurality of magnets 138 are circumferentially arrayed about the stator 44.

Each magnet 138 has a long axis, as indicated in FIG. 4A, the long axis LA orientated axially (parallel with the common axis CA). Each magnet 138 has a short axis SA, as indicated in FIG. 4A, the short axis SA orientated orthogonal to the long axis LA, and tangentially with respect to the rotor 42. The short axis SA of each magnet 138 can be oriented tangentially to a circle centered on the common axis CA. Each magnet 138 has permanent poles, north and south, that are circumferentially orientated. More specifically, each magnet 138 has a north pole at one end of the short axis SA and a south pole at the opposite end of the short axis SA. Each of the north pole and south pole extends the length of the long axis LA, such that the north and south poles are divided by an axial interface along the long axis LA. The north and south poles of each magnet 138 are not axially orientated in the way that magnets are typically divided to the north and south poles at opposite ends of their long axis LA. In the illustrated embodiment, the plurality of magnets 138 are annularly arrayed about the stator 44, but as previously mentioned the plurality of magnets 138 could be annularly arrayed within the stator 44. The stator 44 may not include any permanent magnets but rather is an electromagnet that generates a magnetic field when electrically energized by coils 52 as further described herein. Likewise, the rotor 42 may include only permanent magnets and not include any electromagnets.

The rotor 42 further includes a plurality of concentrators 140. The plurality of concentrators 140 are interleaved with the plurality of magnets 138. In this way, none of the magnets 138 physically contact another magnet 138 and none of the magnets 138 are physically adjacent to another magnet 138. The magnets 138 are nevertheless physically fixed by the plurality of concentrators 140. The plurality of concentrators 140 are orientated axially, such that the long axis of each concentrator 140 is parallel with the common axis CA. The long axis of each concentrator 140 is parallel to the long axis LA of each magnet 138. Each concentrator 140 can be formed by stacked laminations. The long axis of each lamination is orientated parallel with the common axis CA. As such, the grain of the stack of laminations is oriented axially.

Each magnet 138 extends parallel with the common axis. Each magnet 138 can span, and magnetically interact with, multiple phases of the stator 44. For example, each magnet 138 can radially overlap with multiple coils 52 and multiple annular arrays of teeth 156. Each concentrator 140 extends parallel with the common axis. Each concentrator 140 can span, and magnetically interact with, multiple phases of the stator 44. For example, each concentrator 140 can radially overlap with multiple coils 52 and annular arrays of teeth 156.

Laminations can be formed from material which is readily susceptible to polarization from the fields generated by coils. Such material is typically ferromagnetic. The ferromagnetic materials can be metal such as iron or an alloy of iron, such as steel. More specially, laminations can be formed from silicon steel, among other options. Ferromagnetic material can be a ceramic doped or otherwise embedded with ferromagnetic elements.

Stator 44 comprises a plurality of spurs 156. Each spur 156 projects toward the rotor 42. For example, each spur 156 projects radially (orthogonal) with respect to the common axis CA toward the rotor 42. In this embodiment, each spur 156 is a structure that narrows toward the rotor 42 to focus concentrated flux to a limited part of the rotor 42. More specifically, the circumferential width of each spur 156 narrows as the spur 156 extends radially relative to the stator 44 and towards the rotor 42. In some embodiments, the spurs 156 may not narrow toward the rotor 42 but nevertheless may concentrate flux toward the rotor 42. The spurs 156 project outward from the common axis CA in this embodiment because the rotor 42 is located radially outward from the stator 44. However, in alternative inner rotor 42 embodiments, the spurs 156 project inward towards such rotor 42 and towards the common axis CA. The plurality of spurs 156 are arrayed to have a tubular profile. More specifically, the plurality of spurs 156 are arrayed annularly about the common axis CA and arrayed axially along the common axis CA. In this way, the stator 44 comprises a plurality of circular spur arrays 146a-146f. The embodiment of FIG. 4B shows six circular spur arrays 146a-146f, the six circular spur arrays 146a-146f arrayed along the common axis CA. The plurality of circular spur arrays 146a-146f are arrayed along the common axis CA. Each circular spur array 146a-146f is coaxial with the common axis CA. The plurality of circular spur arrays 146a-146f define a cylinder coaxial with the common axis CA. The spurs 156 do not necessarily project into an air gap away from other physical components of the stator 44. Rather, the spurs 156 may be partially or fully embedded in a potting compound such as epoxy. For example, the stator 156 can have a cylindrical exterior with the spurs 156 located inside and/or exposed on the cylindrical exterior surface, but the spurs 156 nevertheless function to focus electromagnetic flux relative to the surrounding potting material.

In this embodiment, the circular spur arrays 146a-146f are part of the plurality of flux rings 142a-146f, respectively. Each flux ring 142 supports all of the spurs 156 of the respective circular spur array 146 of that flux ring 142. For example, flux ring 142a supports all of the spurs 156 of circular spur array 146a. Flux rings 142 are each at least partially formed from laminate. Each flux ring 142a-146f can be a contiguous laminate piece or formed from a plurality of laminate pieces arrayed about the common axis CA. In this embodiment, each flux ring 142a-146f includes a hoop 154, a plurality of trunks 152 that extend radially relative to the hoop 154, and a plurality of branches 150 supported by the plurality of trunks 152.

For each flux ring 142, the hoop 154 extends fully about common axis CA as a ring. Trunks 152 extend radially from hoop 154 and towards rotor 42. In the example shown, trunks 152 extend radially away from common axis CA because motor 24 is an outer rotator. Branches 150 are supported by trunks 152. Branches 150 are disposed at opposite radial ends of trunks 152 from hoops 154. Branches 150 extend circumferentially from trunk 152 in both a first circumferential direction about common axis CA (e.g., one of clockwise and counterclockwise) and a second circumferential direction about common axis CA (e.g., the other of clockwise and counterclockwise). Spurs 156 are formed on an opposite radial side of branches 150 from trunks 152.

In some other embodiments, the flux rings 142 do not include the hoops 154 and/or trunks 152, in which case the branches 150 are directly connected and/or supported by other structure, such as being connected by epoxy or other potting compound. In some embodiments, multiple laminate pieces are assembled together to form each circular flux ring 142 and/or circular spur array 146, such as by a plurality of arc portions that assemble together.

Each hoop 154 is coaxial with the common axis CA. Whether assembled from discrete laminate pieces each supporting multiple but not all spurs 156 of a circular spur array 146 or formed from a contiguous laminate that supports all spurs 156 of a circular spur array 146, the circular spur arrays 146a-146f are supported by flux rings 142a-142f that allow flow of flux between circumferentially adjacent ones of spurs 156. The plurality of flux rings 142a-142f are arrayed along and about the common axis CA. Each flux ring 142a-142f is coaxial with the common axis CA. The laminate pieces 148 forming the flux rings 142a-142f form at least a part of the spurs 156. The spurs 156 in this embodiment include a spur body 158 formed from the laminate and a powdered metal tip 160 formed from powdered metal, as further described herein. It is understood, however, that in various other embodiments the laminate pieces 148 may fully form the spurs 156.

In this embodiment, each spur 156 includes a powdered metal tip 160, which can be ideal in some embodiments due to powdered metal lacking directional grain, however various embodiments are not so limited and each spur 156 may not include a powdered metal component. As such, each spur 156 can be formed partially or entirely by laminate, such as by the laminate piece 148 of its associated flux ring 142. As shown, multiple circumferentially adjacent spurs 156 of a common flux ring 142 are formed by a single, common laminate piece 148. More specifically, in the embodiment shown the spur bodies 158 of the multiple circumferentially adjacent spurs 156 of the same flux ring 142 are formed by a single laminate piece 148.

Each spur 156 can be contiguous with the branch 150, trunk 152, and/or the hoop 154 of its flux ring 142. In this way, the spurs 156, branches 150, trunks 152, and/or the hoops 154 of a single flux ring 142 can be formed from a single laminate piece or by multiple laminate pieces. Each spur 156 of a spur array 146 can thereby be formed by a common laminate piece. In the embodiment shown, the laminate pieces 148 forming the flux rings 142a-142f are contiguous pieces. As such, the laminate portion of each flux ring 142a-142f is formed by contiguous laminate. The spurs 156, branches 150, trunks 152, and/or the hoops 154 can have a laminate grain that extends radially (e.g., is orthogonal) with respect to the common axis CA. Such laminate grain may be only radially orientated.

As shown in FIG. 4B, the stator 44 is formed from an array of phase assemblies 50a-05c. The phase assemblies 50a-50c are arrayed along the common axis CA. Each phase assembly 50a-50c includes a pair of circular spur arrays 146a-146b, 146c-146d, 146e-146f, respectively. As such, phase assembly 50a includes paired circular spur arrays 146a, 146b; phase assembly 50b includes paired circular spur arrays 146c, 146d; and phase assembly 50c includes paired circular spur arrays 146e, 146f. In this embodiment, each phase assembly 50a-50c includes a pair of flux rings 142a-142b, 142c-142d, 142e-142f, respectively. Each pair of circular spur arrays 146a-146b, 146c-146d, 146e-146f, are respectively connected by axial returns 144. Each pair of flux rings 142a-142b, 142c-142d, 142e-142f, are respectively connected by the axial returns 144.

Each phase assembly 50 includes a coil 52 disposed axially between the paired flux rings 142 of that phase assembly 50. The coils 52 extend circumferentially about the common axis CA such that the common axis CA extends through the ring formed by each coil 52. The coils 52 are disposed axially between laminate portions of each phase assembly 50. Each coil 52 is thereby bracketed by laminate stacks.

The axial returns 144 extend between and connect the paired flux rings 142 forming a phase assembly 50. The axial returns 144 are disposed about common axis CA and form a circular array of axial returns 144 for each phase assembly 50. The axial returns 144 are disposed on an opposite radial side of coils 52 from rotor 42. The axial returns 144 are disposed on an opposite radial side of coils 52 from permanent magnet array 46. The array of axial returns 144 defines a cylinder through which the common axis CA extends. The axial returns 144 are disposed on an opposite radial side of branches 150 from spurs 156. The axial returns 144 can be in direct contact with the laminate of each flux ring 142 of a phase assembly 50. For example, each axial return 144 can directly contact the radial side of each branch 150 opposite the spurs 156. In the example shown, axial returns 144 directly contact the radially inner side of each branch 150 because motor 24 in an outer rotator.

Each axial return 144 is formed by a stack of laminations that have a grain orientation that is axial (i.e. parallel with the common axis CA). The laminate grain of the axial returns 144 may only be axial. The laminate grain of the axial returns 144 can thereby be orthogonal to the laminate grain of the laminate forming flux rings 142. As such, motor 24 can include one or more arrays of axially-oriented laminations disposed about common axis CA. The one or more arrays of axially-oriented laminations define cylinders that are coaxial with common axis CA and are thus coaxial with each other. As further explained herein, the axial returns 144 conduct electromagnetic flux between each flux ring 142 of the pair of flux rings 142 forming a phase assembly 50. In the example shown, a first array of axial returns 144 conducts electromagnetic flux between the paired flux rings 142a-142b; a second array of axial returns 144 conducts electromagnetic flux between the paired flux rings 142c-142d; and a third array of axial returns conducts electromagnetic flux between the paired flux rings 142e-142f. The axial returns 144 conduct electromagnetic flux between the paired flux rings 142 of each phase assembly 50. Likewise, the axial returns 144 conduct electromagnetic flux between each pair of circular spur arrays 146a-146b, 146c-146d, 146e-146f. Likewise, the axial returns 144 conduct electromagnetic flux between axially adjacent branches 150 of paired ones of the flux rings 142. As further explained herein, the spurs 156 of paired flux rings 142a-142b, 142c-142d, 142e-142f and thus of paired circular spur arrays 146a-146b, 146c-146d, 146d-146f form a plurality of flux circuits through the stator 44 that magnetically acts on the magnets 138 of the rotor 42 to rotate the rotor 34 relative to the stator 44.

The closest flux ring 142 and/or laminate piece 148 and/or spur 156 (or other laminate structure that routes flux to a magnet 138) to the displacement member 34 (and pumping chamber(s) of the displacement pump 28, and the pump body 36 of the displacement pump 28) along common axis CA is axially closer than the closest coil 52 along common axis CA. This is because, in part, there are no end turns of the coils that extend axially relative to the motor 24, as discussed in more detail below.

Figure 5A:
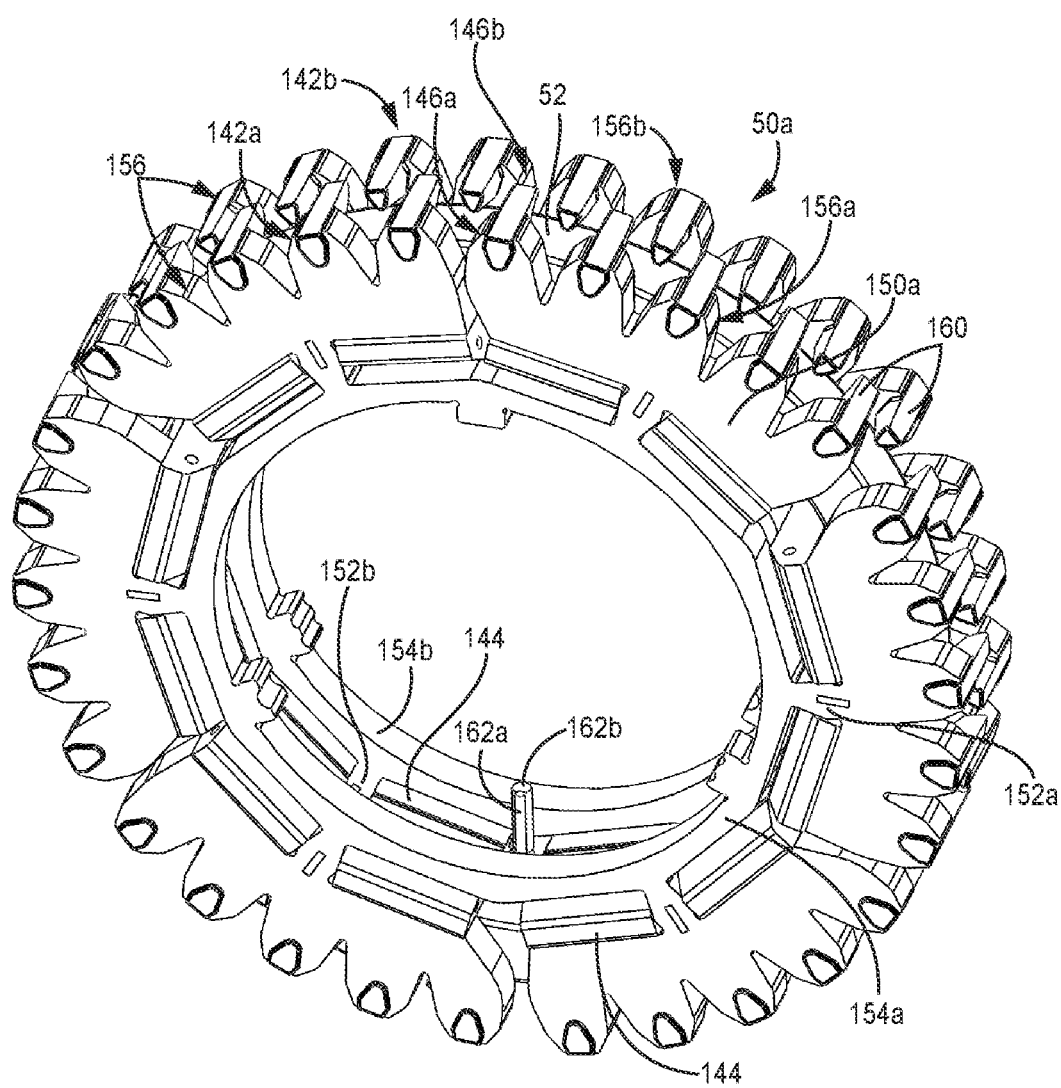
FIG. 5A is an isometric view of a phase assembly of the stator shown in FIG. 4B.
Figure 5B:
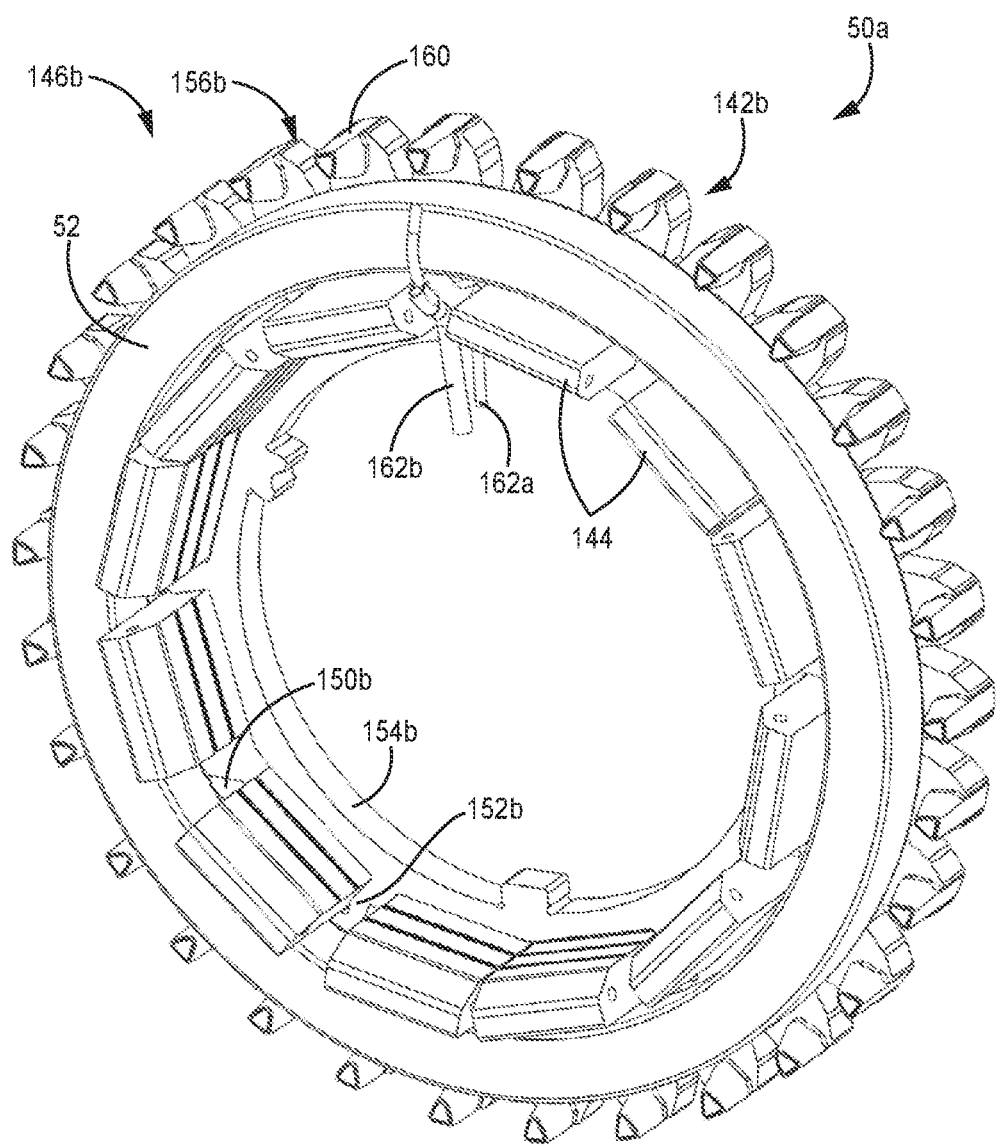
FIG. 5B is an isometric view of the phase assembly shown in FIG. 5A with a flux ring removed for clarity.

FIG. 5A is an isometric view of phase assembly 50a. FIG. 5B is an isometric view of phase assembly 50a with flux ring 142a removed for clarity. FIGS. 5A and 5B will be discussed together. While phase assembly 50a is shown and discussed in more detail, it is understood that the other phase assemblies 50b, 50c (best seen in FIG. 4B) can be structurally and functionally identical, the only difference being that the signals delivered through the coils 52 of the phase assemblies 50a-50c are out of phase with respect to each other. In addition, the phase assemblies 50a-50c can be rotated about common axis CA relative to each other to form stator 44. Flux ring 142a includes circular spur array 146a, branches 150a, trunks 152a, hoop 154a, and spurs 156a. Flux ring 142b includes circular spur array 146b, branches 150b, trunks 152b, hoop 154b, and spurs 156b.

The phase assembly 50a is formed by a pair of paired flux rings 142a, 142b with a coil 52 sandwiched axially between the paired flux rings 142a-142b. Each coil 52 is a winding of wire, typically copper, around the common axis CA. Thus, each coil 52 could be a continuous winding of 20, 30, 40, 50, 100, or less or more loops around the common axis CA. In some embodiments, a ribbon is wound instead of a wire. Each coil 52 has two termination wires 162a, 162b representing the ends of the circuit of each coil 52. FIG. 5B best shows the wire ends 162a, 162b of the coil 52 for running an AC signal through the coil 52, which can electrically connect with controller 29.

Coil 52 is radially overlapped by the spurs 156a, 156b of the phase assembly 50a due to portions of each of the spurs 156a, 156b projecting axially along the common axis CA. As such, a radial line extending from common axis CA can pass through each of coil 52 and a portion of a spur 156 of phase assembly 50. The radial line can extend through an axial return 144, coil 52, and a portion of a spur 156. In the example shown, powdered metal tips 160 extend axially over coil 52. As such, a radial line extending from common axis CA can extend through laminate (e.g., the laminate of axial return 144), wire (e.g., the wire of coil 52), and powdered metal (e.g., the powdered metal of a powdered metal tip 160). In some other embodiments, the spurs 156 do not project axially and instead only project radially (either toward or away from the common axis CA).

Coil 52 is disposed directly between the paired flux rings 142a, 142b. Coil 52 is disposed in an axial gap formed between the paired flux rings 142a, 142b. More specifically, the coil 52 is directly between the laminate stacks that form the flux ring 142a and the lamination stacks that form the flux ring 142b. At least a portion of the coil 52 is directly between opposed branches 150a, 150b of the paired flux rings 142a, 142b. At least a portion of the coil 52 is directly between parts of each pair of spurs 156a, 156b of the paired circular spur arrays 146a, 146b (e.g., spurs 156a of spur array 146a and spurs 156b of spur array 146b). The coil 52 is directly axially between the parts of the paired circular spur arrays 146a, 146b that are formed by laminate. As such, the coil 52 is axially bracketed by laminate.

The coil 52 radially overlaps with the axial returns 144. In this particular embodiment, the coil 52 is sandwich radially between the axial returns 144 and portions of the spurs 156a, 156b due to the spurs 156a, 156b each having an axially projecting section. As such, coil 52 is disposed in an annular chamber coaxial with the common axis CA and defined by axial returns 144 and flux rings 142a, 142b. In the example shown, three of the four sides of the annular chamber (e.g., the two axial sides and one of the radial sides) are formed by laminate. In the example shown, one of the four sides of the annular chamber is formed by powdered metal components (e.g., the powdered metal tips 160 of spurs 156a, 156b). It is understood, however, that some examples include an annular chamber with all four sides defined by laminate. In some examples, the annular chamber can be three sided, such as where spurs 156a, 156b do not include an axially extending component.

Figure 6C:
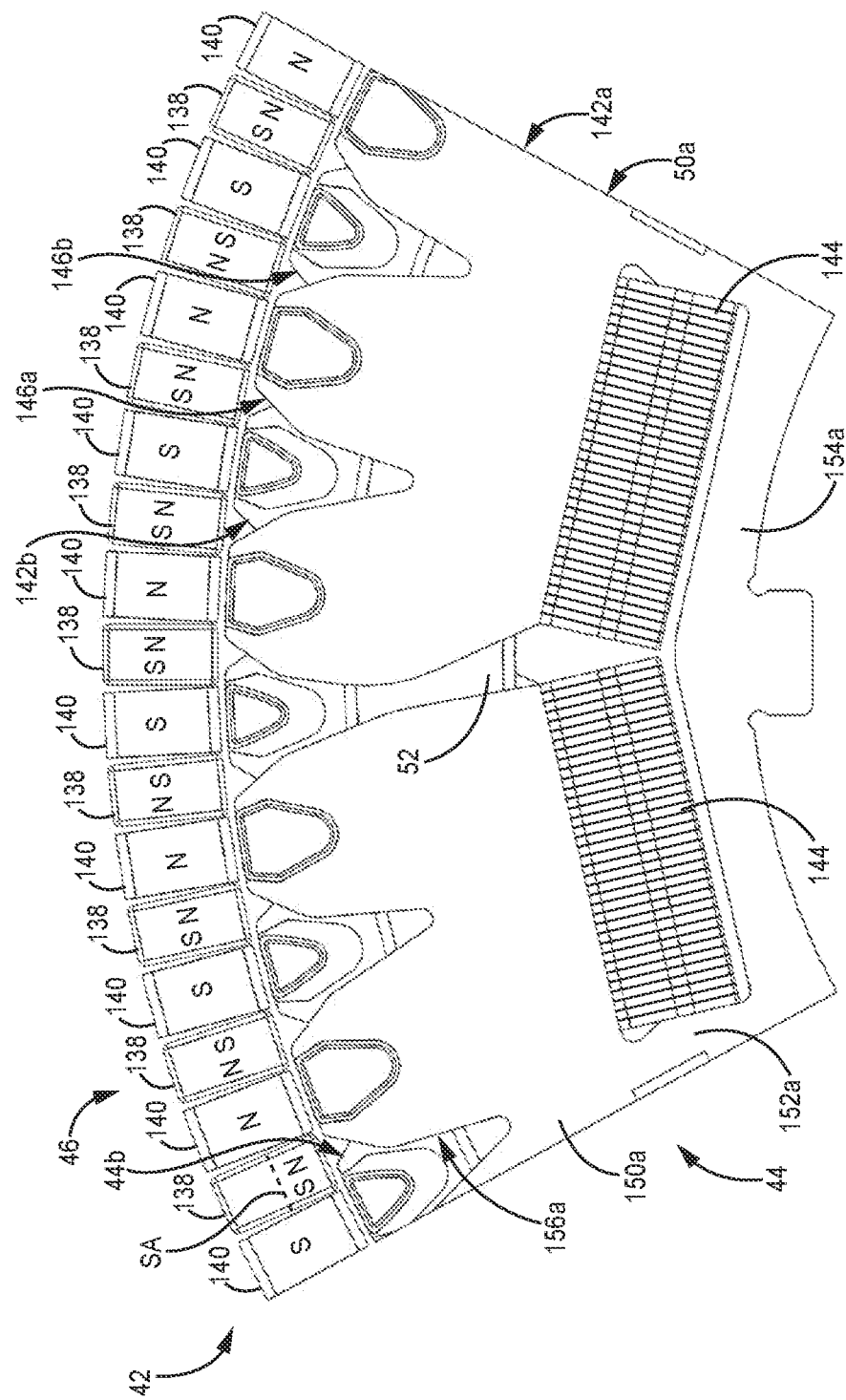
FIG. 6C is an enlarged end view showing magnetic polarity of components of the rotor portion of the motor.

FIGS. 6A and 6B demonstrate how flux circuits are formed through flux paired ones of spurs 156a, 156b. FIG. 6C shows a detailed view of flux paired spurs 156a, 156b of phase assembly 50a interacting with permanent magnet array 46 of rotor 42. FIGS. 6A-6C will be discussed together. Flux paired spurs refers to respective closest pairs of spurs 156 of the opposed circular spur arrays 146 of a phase assembly 50 (e.g., the closest pairs of spurs 156a, 156b of the opposed circular spur arrays 146a, 146b of the phase assembly 50a). While spurs 156a, 156b are highlighted as flux paired ones of spurs in FIGS. 6A-6C, it is understood that these are examples and all spurs 156a, 156b of flux rings 142a, 142b similarly flux pair across the circular spur arrays 146a, 146b.

Each spur 156a is part of a similar flux circuit with its corresponding flux pair spur 156b. The flux paired spurs 156a, 156b pair generally axially with a spur 156a, 156b of the opposing circular spur array 146a, 146b, and not circumferentially to the neighbor spur 156a, 156b of the same circular spur array 146a, 146b because all spurs 156a of circular spur array 146a will have the same polarity at any given time while all spurs 156b of the opposed circular spur array 146b of the same phase assembly 50a will have the opposite polarity at any given time. More specifically, each spur 156a of circular spur array 146a flux pairs with the closest spur 156b of the circular spur array 156b on the other axial side of the coil 52. As shown in FIGS. 6A and 6B, a flux circuit is formed through flux paired spurs 156a, 156b such that the spurs 156a, 156b are respectively polarized, north and south.

The flux is generated by coils 52. Specifically, an AC signal is run through each coil 52 which rapidly builds and collapses the magnetic field due to the current reversal of the AC signal through the coil 52. As shown, flux concentrating material of the flux rings 142a, 142b and axial returns 144 is wrapped around at least three sides of the coil 52. The lamination grain of the flux concentrating material is shown in FIGS. 6A and 6B. Generally, flux flows with the grain, along the direction of lamination, as flux will generally follow the path of highest permeability and there is significant resistance to flux jumping from one layer of lamination to another layer of lamination. The lamination grain of the branches 150a, 150b (including the spurs 156a, 156b except for the powdered metal tips 160) is radially orientated while the lamination grain of the axial returns 144 is axially oriented. As such, the flux flows axially through the axial returns 144 and radially through the branches 150a, 150b and spurs 156a, 156b in a U shape toward the rotor 42, the base of the U on an opposite side of the coil 52 from the rotor 42 and the legs of the U oriented towards the rotor 42. FIGS. 6A and 6B represent the reversal of the AC signal and how the poles of the flux paired spurs 156a, 156b are switched.

The flux paired ones of spurs 156a, 156b are circumferentially offset from each other such that the spurs 156a are not axially aligned with spurs 156b. Being that the ends of the flux paired spurs 156a, 156b are not aligned axially because spurs 156a are offset circumferentially from spurs 156b, the flux circuit travels at least a limited distance circumferentially between the flux paired ones of spurs 156a, 156b. Therefore, a cumulative flux circuit comprised of a plurality of flux paired spurs 156a, 156b can flow in a spiral pattern circumferentially through the spurs 156a, 156b and axial returns 144. It is noted that, while most flux flows between flux paired ones of spurs 156a, 156b, the branches 150a, 150b permit flux flow between spurs 156a, 156b of the same branch 150a, 150b, such that a limited amount of flux may skip a flux paired spur 156a, 156b to the next-over spur 156a, 156b of the same branch 150a, 150b.

FIG. 6C shows a detailed view of flux paired spurs 156a, 156b of the stator 44 interacting with concentrators 140 and magnets 138 of the rotor 42. The AC signal through the coil 52 changes current direction rapidly and thus changes the north-south polarity of the flux paired spurs 156a, 156b rapidly. The view of FIG. 6C shows an instance in which all spurs 156a of the circular spur array 146a have a north polarization while all spurs 156b of the circular spur array 146b have a south polarization. Also at this instance, the spurs 156a, 156b are aligned with the concentrators 140 that are disposed circumferentially between the magnets 138. The laminate of the concentrators 140 does not have an inherent polarization, but due to the fixed position of concentrators 140 between magnet poles, the concentrators 140 assume an effective permanent polarization as indicated. Each concentrator 140 contacts two magnets 138. Each concentrator 140 contacts the same pole of the two magnets 138. For example, a concentrator 140 will be in contact with two south poles or in contact with two north poles. The concentrators 140 take on alternating north and south polarization on opposite sides of each magnet 138 depending on the polarization adjacent that concentrator 140. As indicated, each magnet 138 is permanently polarized north and south on opposite sides of its short axis. The interleaved arrangement of magnets 138 and concentrators 140 creates oppositely polarized concentrators 140 and magnet 138 poles.

The concentrators 140 route the magnetic flux from the magnets 138 toward the stator 126. Flux circuits are completed across the air gap 60 between the stator 44 and rotor 42. The flux from the rotor 42 (specifically the magnets 138) and the flux from the coil 52 (through the spurs 156a, 156b) interact in the air gap 152, and the resulting flux shear forces rotation of the rotor 42. The flux of the present motor 24 has an orientation transverse to the axis of rotation (which axis of rotation is coaxial with common axis CA). This is different from the radial flux orientation of traditional AC and DC brushless motors.

The flux generated by the stator 44 and acting on the rotor 42 is constantly changing due to both changing position of the magnets 138 and concentrators 140 due to rotation of the rotor 42 as well as the change in polarization of the spurs 156a, 156b due to the change in the AC signal through the coil 52. As such, the AC signal routed through the coil 52 is synchronized with rotation of the rotor 42 to develop magnetic fields through the spurs 156a, 156b in time to the concentrators 140 approaching and departing the spurs 156a, 156b to simultaneously push and pull the magnets 138 of the rotor 42 to provide the force that rotates the rotor 42. More specifically, the N-N and S-S interfaces repel, while N-S attract, on approach and departure of alignment.

The respective AC signals (e.g., sinusoidal or trapezoidal) delivered through the multiple coils 52 forming stator 44 are out of phase with respect to each other. In this way, the magnets 138 (along their lengths) more frequently have flux peaks acting on them, as compared to synchronizing the sinusoidal AC signals, for a smoother torque profile acting on the rotor 42 along the axis of rotation of the rotor 42, which is also the common axis CA. The embodiment of the motor 24 shown in FIGS. 2, 4A, and 4B includes three phases corresponding to the three phase assemblies 50a-50c and the coils 52 therein in which three sinusoidal AC signals are delivered through the coils 52, 120-degrees electrically offset. If there were two phase assemblies 50 and two coils 52, then the two sinusoidal AC signals would be 180 degrees apart, or 90 degrees apart for sets of four phase assemblies 50.

Being that the magnets 138 are elongate and radially overlap with multiple coils 52, each magnet 138 is electromagnetically acted upon by multiple ones of the coils 52. More specifically, each magnet 138 can be electromagnetically acted upon by three coils 52 simultaneously along the length of the magnet 142, in the example shown. As such, multiple different coils 52 can electromagnetically act on each magnet 138 simultaneously. Also, each magnet 138 may be electromagnetically acted upon by only three coils 52 (or only two coils 52 in a two-phase motor 24 embodiment, or only four coils 52 in a four-phase motor 24 embodiment, etc.) throughout operation. This is unlike conventional AC induction motors in which each magnet interacts will all windings of a traditional circumferential array of windings around the axis of rotation of the rotor. The motor 24 has multiple stator phases but continuous rotor phases due to each magnet 138 being symmetrical along its long axis.

Traditional AC induction motors use a plurality of discrete coils that form an array of coils that extend circumferentially around the axis of rotation of the rotor (See FIGS. 10A and 10B). Each coil represents a potential pole for acting on a magnet. The discrete coils arrayed circumferentially around the axis of rotation in a conventional AC induction motor are out of phase with respect to each other. The discrete coils can interact with a small subset of the magnets at any given instance. The potential torque generated is proportional to the number of poles. The number of poles in such a motor is limited by the ability to fit discrete coils circumferentially around the axis of rotation within the motor. Coil windings can be made smaller, and the diameter of the stator can be made bigger, to accommodate more coils to support more poles, but this increases the size, weight, and cost of the motor and still has limits. Power can also be increased when the rotor is rotating at a relatively high rate, whereby more coil-magnet passes can be experienced per unit time. But such power increase requires the motor to operate at relatively high speed, when some applications may desire low-speed output. Providing reduction gearing to reduce speed and increase torque to the desired high torque and low speed increases cost, weight, size, and friction.

Motors 24 according to the present disclosure are different from traditional AC and DC brushless motors. An aspect of the motor 24 is that it contains relatively few coils 52, only three in the illustrated embodiment. Unlike traditional AC and DC brushless motors, the coils 52 are formed from loops of wire that extend entirely around the axis of rotation of the rotor 42 (and the common axis CA). The axis of rotation of the rotor 42 (and the common axis CA) extends through each loop (e.g., the center of each loop). Each coil 52 is annular, and the loops of each coil 52 are likewise annular, and the circular planar profile of the coil 52 and loops are orthogonal to the common axis CA. The wire of each coil 52 forms a single hoop, which has multiple loops that overlap and contact one another to form the single hoop assembly. The coils 52 do not include loops that generate flux that rotates the rotor 42 through which the common axis CA does not extend. Instead of adding a coil for each pole as in traditional AC induction motors, the branches 150 and axial returns 144 surrounding a single coil 52 channel the flux to a plurality of spurs 156 which flux pair across the branches 150 to create a plurality of poles from the single coil 52. In the example shown, for each phase assembly 50 one coil 52 supports thirty poles as the example flux rings 142 each include thirty spurs 156, although lower and higher poles can be created depending on the number of spurs 156 of the circular spur arrays 138. As such, activating one coil 52 activates many poles, whereas in some traditional AC and DC brushless motors activation of one coil activates only one pole. In some examples, each coil 52 can interact with each magnet 138 at a given instance. Moreover, multiple coils 52 are arrayed along the axis of rotation of the rotor 42 as part of multiple phase assemblies 50, thereby multiplying the number of poles.

The high pole count eliminates or reduces the need for reduction gearing, further reducing off-center forces as well as reducing weight and friction, allowing for a more compact arrangement of pump apparatus 12. Being that pumping applications are typically performed at low-speed, the high pole count allowed by the present motor 24 design means that high torque can generate high fluid pressure even at low pumping speed with minimal or no gearing reduction, again reducing cost, weight, friction, and package size. For at least these reasons, the motors 24 of the present disclose can generate high torque with a small package size, even at low speed where pumps typically operate. Therefore, gear reduction of the drive can be minimized or entirely excluded, providing savings on cost, size, weight, and friction.

Figure 7:
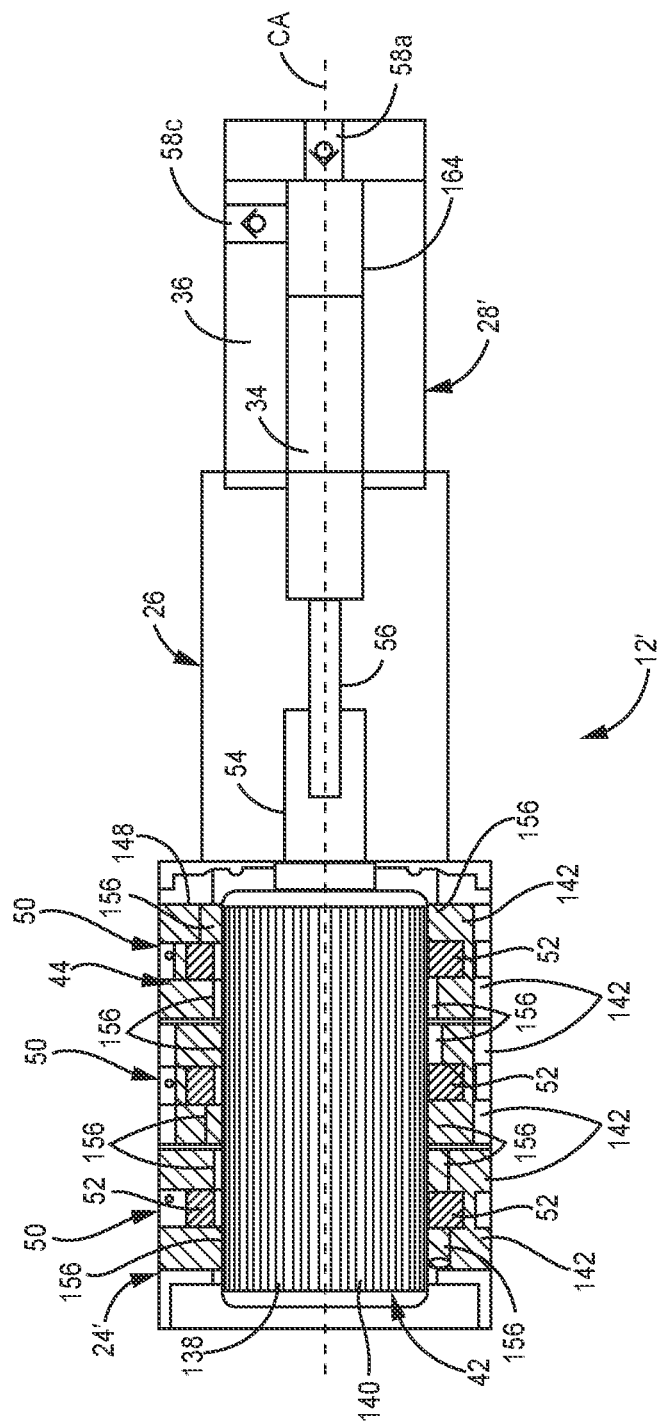
FIG. 7 is a schematic block diagram of a pump apparatus.

FIG. 7 is a schematic diagram of pump apparatus 12'. Pump apparatus 12' includes motor 24', drive 26, and displacement pump 28'. Motor 24' is an inner rotator that has rotor 42' disposed within stator 44'. The rotor 42' rotates within stator 44'. Stator 44' is substantially similar to stator 44 (best seen in FIG. 5A) except that spurs 156 of stator 44' extend radially inward towards the common axis CA and towards the inner rotor 42', whereas spurs 156 of outer rotators project radially outward relative to the common axis CA and toward the outer rotor 42. Rotor 42' is substantially similar to rotor 42 (best seen in FIGS. 2 and 5A) except that permanent magnet array 46 is disposed on a radially outer side of rotor 42' relative to common axis CA, whereas permanent magnet array 46 of outer rotator motors are disposed on a radially inner side of the outer rotating rotor 42.

In the example shown, displacement pump 28' includes inlet check valve 58a and outlet check valve 58c, which can be any desired form of one-way valve, such as ball and seat valves among other options. Each of inlet check valve 58a and outlet check valve 58c are stationary relative to common axis CA. Pumping chamber 164 is fluidly connected to each of inlet check valve 58a and outlet check valve 58c. The volume of pumping chamber 164 increases as fluid displacement member 34 is drawn axially towards motor 24' and the volume of pumping chamber 164 decreases as fluid displacement member 34 is driven axially away from motor 24'. In the example shown, displacement pump 28' is a single displacement pump that drives fluid downstream only during one of the pump strokes. It is understood, however, that displacement pump 28' can be a double displacement pump similar to displacement pump 28 (FIGS. 1A-3C) such that displacement pump 28' outputs fluid during each stroke of a pump cycle.

The closest flux ring 142 and/or laminate piece 148 and/or spur 156 (or other laminate structure that routes flux to a magnet 138) to the displacement member 34 (and pumping chamber 164) along common axis CA is located at an axial location closer to the displacement pump 28' (and pumping chamber 164) than the axially closest coil 52. This is because, in part, there are no end turns of the coils 52 that extend axially. Pump apparatus 12' thereby provides a compact, efficient pumping arrangement.

Figure 8:
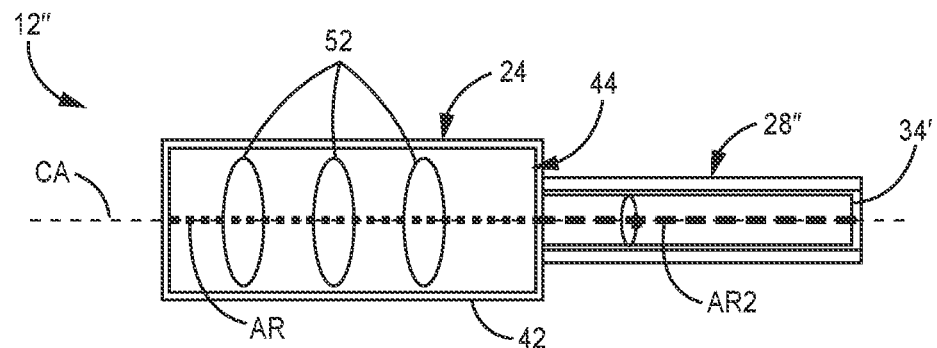
FIG. 8 is a schematic block diagram of a pump apparatus.

FIG. 8 is a schematic block diagram of pump apparatus 12". While various other embodiments referenced herein can have a linearly reciprocating fluid displacement member 34, the fluid displacement member 34' of this embodiment, and various other embodiments, rotates and may or may not reciprocate. The pump apparatus 12" of FIG. 8 includes a motor 24 having a rotor 42 that rotates inside or outside of the stator 44. The stator 44 includes a plurality of coils 52 (three in this embodiment but a greater or lesser number can be provided in various other embodiments) that generate magnetic flux through the stator 44 to drive the rotor 42. The rotor 42 rotates coaxially with common axis CA. The fluid displacement pump 28" includes a fluid displacement member 34' that rotates. The fluid displacement member 34' can be elongate along the common axis CA. The fluid displacement member 34' can be coaxial with the common axis CA. The fluid displacement member 34' can rotate coaxially with respect to the common axis CA. Rotation of the fluid displacement member 34' can pump fluid. The axis of rotation AR of the rotor 42 can be coaxial with the axis of rotation AR2 of the fluid displacement member 34'

The displacement pump 28" of FIG. 8 can be a progressive cavity pump, a vane pump, an impeller pump, or a peristaltic pump, amongst other options. There may be no mechanical amplification between the rotor 42 and the rotating fluid displacement member 34'. For example, there may be no gearing between the rotor 42 and the rotating fluid displacement member 34', or possibly no gearing on the entire pump apparatus 12". The rotor 42 and the rotating fluid displacement member 34' may be fixed such that one revolution of the rotor 42 results in one revolution of the rotating fluid displacement member 34'.

In the case of a peristaltic pump, the rotating fluid displacement member 34' can be a type of rotor that rotates within a housing that contains flexible tube, the rotor forming the fluid displacement member 34' moving along to progressively and repeatedly squeeze along a part of the length of the flexible tube against the inside of the housing, the rotor starting and releasing its squeeze of the flexible tube repeatedly along the length of the tube as the rotating fluid displacement member 34' rotates.

In the case of a vane pump, the rotating fluid displacement member 34' can be a rotor that rotates within a housing. Two vanes may project from the rotor forming the fluid displacement member 34" in opposite directions, inside the housing. The vanes may be supported on one or more springs to allow the vanes to move in and out of the rotor to adapt to the inner shape of the housing. The housing may be coaxial with common axis CA. The rotor may rotate about an axis of rotation that is coaxial with the common axis CA.

Figure 9:
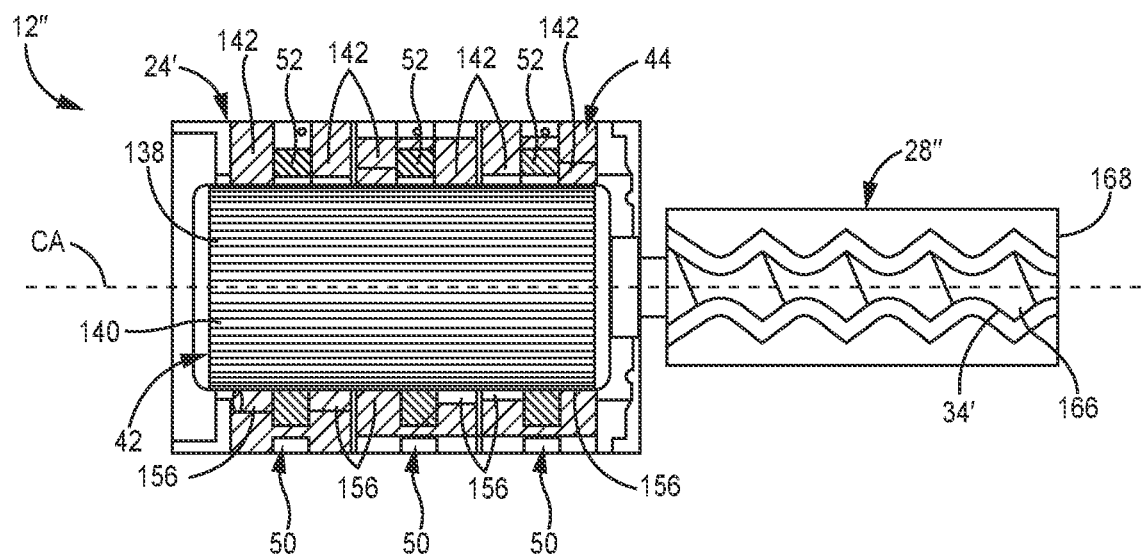
FIG. 9 is a schematic block diagram of a pump apparatus.

FIG. 9 is a schematic block diagram showing the displacement pump 28" as a progressive cavity pump. The inner rotator motor 24' is connected to the fluid displacement member 34' to cause pumping by displacement pump 28". In this embodiment, the rotating fluid displacement member 34' is a helical rotor 166. The helical rotor 166 rotates within a progressive cavity stator housing 168. The helical rotor 166 can include fins, as shown, for propelling or otherwise moving a liquid, such as water. An elastomer on the inside of the progressive cavity stator housing 168 forms a series of cavities including lobes into which the helical rotor 166 enters and exits to progressively move a plurality of respective pockets from one end of the pump to the other, the fluid moved through the pockets under pressure. The helical rotor 166 may rotate about common axis CA. Helical rotor 166 may rotate coaxially with respect to the common axis CA. In some embodiments, the helical rotor 166 can be provided inside of a tube with a cylindrical inner profile (e.g., not a progressive cavity) or the helical rotor 166 can be entirely exposed in the liquid medium being moved without an outer sleeve surrounding the helical rotor 166.

Figure 10:
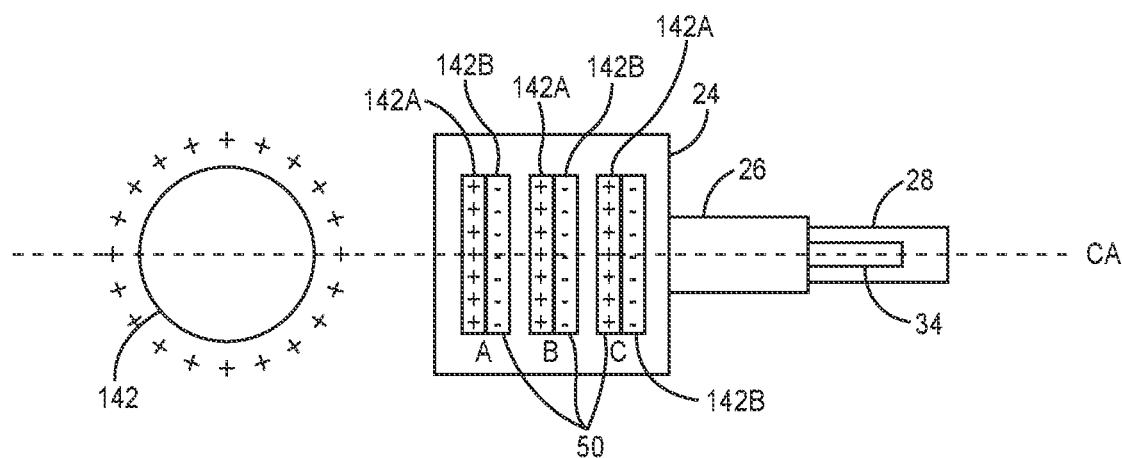
FIG. 10 is a schematic block diagram of a pump apparatus.

Apparatuses according to the present disclosure may have various advantages, as discussed herein. One advantage may be decreasing canting of a fluid displacement member, which can otherwise result in side-loading and premature failure. FIG. 10 shows a schematic diagram of motor 24 operably connected to pump 28. In particular, a flux ring 142 is shown. As discussed and shown previously, an annular arrays of teeth 156 (not shown in FIG. 10) are polarized simultaneously by a coil (not shown in FIG. 10), to the same polarity, entirely about the flux ring 142. This is represented by "+" symbols about the flux ring 142, however depending on the portion of the phase cycle, could be "−" instead. FIG. 10 further shows the phases assemblies 50 of the motor 24. The phase assemblies 50 are labeled A, B, and C representing three phases, operated 120 degrees electrically offset. In this way, the phases are operated along the common axis. As shown, each phase assembly 50 includes a first flux ring 142A and a second flux ring 142B. The teeth of each flux paired set of first and second flux rings 142A, 142B are respectively oppositely polarized positive and negative, shown as "+" and "−". Each pole of a flux ring 142A, 142B is simultaneously polarized positive or negative 360-degrees around the common axis CA. The oppositely polarized orientation between the first and second flux rings 142A, 142B of each phase assembly 50 changes with the sinusoidal input signal to the respective coil of the phase assembly 50. Being that the first and second flux rings 142A, 142B are axially arrayed and oppositely charged, an axial force can be generated between them and the magnets of the rotor, except that such axial forces are balanced and canceled due to the two oppositely polarized first and second flux rings 142A, 142B. Each ring 142A, 142B is polarized completely around the common axis CA, balancing loads. It is possible that wear and tear over the course of time could degrade proper function of any motor, and such degradation could lead to an imbalance between the first and second flux rings 142A, 142B relative to the magnets (such as due to loss or defects in the materials, such as the coil), which due to the axially directed phases an imbalance would only urge the motor 24, and consequently the drive 26 and the fluid displacement member 34, axially along the common axis. Such unintended force would not present a problem due to the pump 28 being configured for the fluid displacement member 34 to move axially. As such, motor 24 prevents undesired side loading on fluid displacement member 34.

Figure 11:
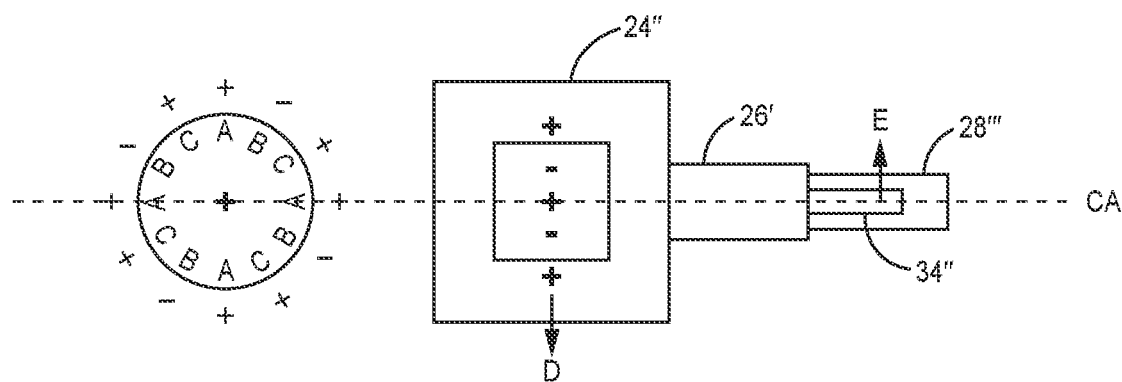
FIG. 11 is a schematic block diagram of a pump apparatus.

FIG. 11 shows a schematic diagram of a pump 28''' operated by a conventional radial flux electric motor 24", in which coils are arrayed around the common axis, not along the common axis. Accordingly, the phases A, B, C are arrayed around the common axis. Pump 28''' can be substantially similar to any one of pumps 28, 28', 28". Not only are fewer poles available to evenly spread the forces around the common axis, but any imbalance in the phases due to wear and tear would generate a moment on the rotor, as depicted by the downward force. This is in contrast to the imbalance creating an axial force as discussed with regard to FIG. 10. Such an errant force on the motor 24" would pivot the motor 24" about the drive 26', which can be substantially similar to drive 26', to the extent there is any play in the drive 26', thereby urging the fluid displacement member 34" off the common axis and loading the side of the fluid displacement member 34", which causes premature wear the fluid displacement member 34", particularly if the fluid displacement member 34" is relied upon to provide a dynamic sealing surface, such as with a piston. The radial force D in the motor 24" can cause the radial reaction force E in the pump 28"'. Accordingly, motors according to the present disclosure have advantages over conventional radial flux motors in operating pumps and similar fluid moving apparatuses.

Figure 12A:
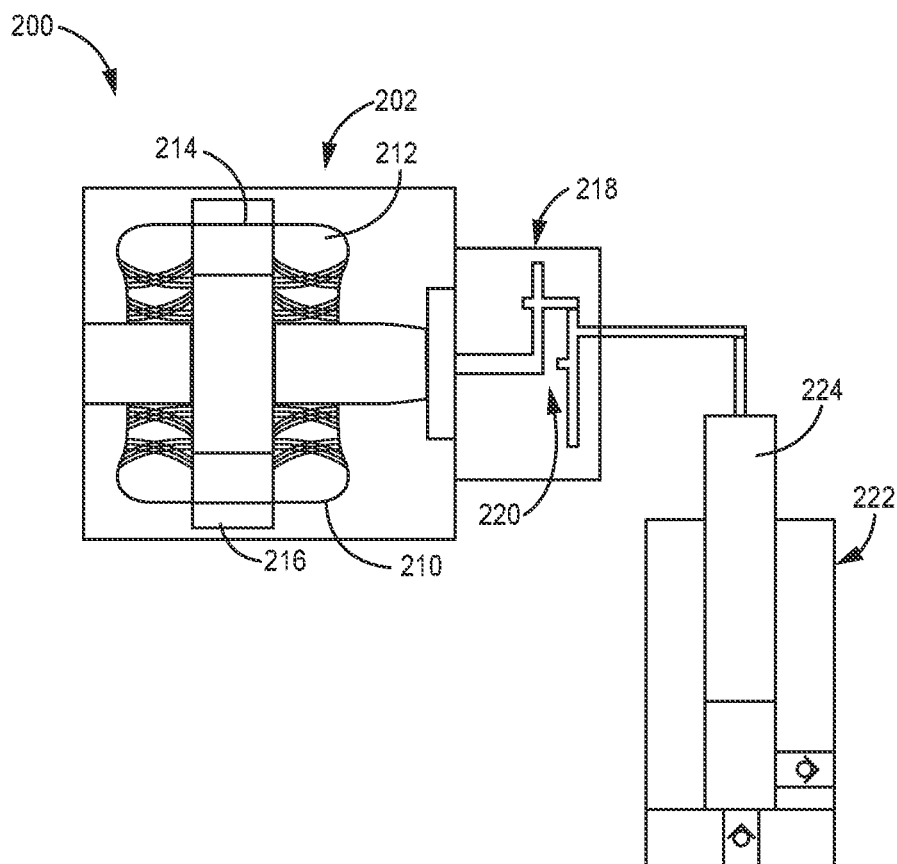
FIG. 12A is a schematic block diagram of a prior art pump apparatus.
Figure 12B:
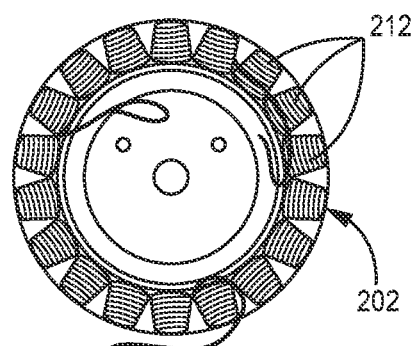
FIG. 12B is an end view of a prior art motor.

FIG. 12A is a schematic block diagram of a prior art pump apparatus 200. FIG. 12B is a prior art schematic end view of a conventional AC induction motor 202. As shown, the end turns 210 of the coils 212 extend closer to the fluid displacement member 34 than the steel laminations 214 and magnets 216. These end turns 210 serve relatively little purpose other than returning the loops of the coils 212 back to overlap with the steel laminations 214. Not having such end turns 210, as is the case in motors 24, 24', reduces the length of the motor and eliminates weight and cost associated with such end turns 210.

The prior art pump apparatus 200 includes a drive 218 formed by reduction gearing 220 that increases torque and reduces the speed output by the motor 202. The reduction gearing 220 connects the pump 222, specifically the fluid displacement member 224, to the motor 202. The fluid displacement member 224 reciprocates on an axis misaligned with a rotational axis of the rotor of the motor 202. The axes are transverse in the example shown. The gearing 220 adds offsets and additional structure that cause the axis of the fluid displacement member 224 to be misaligned with the axis of the motor 202.

While the pumping assemblies of this disclosure and claims are discussed in the context of a spraying system, it is understood that the pumping assemblies and controls can be utilized in a variety of fluid moving contexts and systems and are not limited to those discussed. Any one or more of the pumping assemblies discussed can be utilized alone or in unison with one or more additional pumps to move fluid for any desired purpose, such as location transfer, spraying, metering, application, propulsion, etc.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump apparatus for pumping fluid, the apparatus comprising:
    an electric motor configured to generate a rotational output, the electric motor comprising:
        a motor rotor configured to rotate about a common axis, the motor rotor comprising a permanent magnet array, the permanent magnet array disposed annularly around the common axis; and
        a motor stator configured to be electrically energized to generate magnetic flux that causes the motor rotor to rotate, the motor stator comprising:
            a plurality of coils, the plurality of coils arrayed along the common axis, each coil of the plurality of coils coaxial with the common axis; and
            a plurality of circular spur arrays arranged in sets of paired circular spur arrays that are arrayed along the common axis;
        wherein each respective circular spur array of the plurality of circular spur arrays includes a plurality of spurs that are arrayed in a circle coaxial with the common axis, all spurs of the plurality of spurs of the respective circular spur array configured to be polarized simultaneously by a respective coil of the plurality of coils to generate flux to rotate the motor rotor relative to the motor stator;
        wherein each set of paired circular spur arrays has a first circular spur array and a second circular spur array, and each respective coil of the plurality of coils is located between a respective set of paired circular spur arrays; and
        wherein each set of paired circular spur arrays includes a plurality of axial returns extending so that each axial return of the plurality of axial returns radially overlaps the first circular spur array of the set of paired circular spur arrays and the second circular spur array of the set of paired circular spur arrays to allow a flux circuit to polarize pairs of spurs on the first circular spur array and the second circular spur array; and
    a fluid pump operably connected to the electric motor to be powered by the electric motor, the fluid pump comprising:
        a pump stator; and
        a pump rotor disposed coaxially with the motor rotor on the common axis and connected to the motor rotor to receive the rotary output from the motor rotor, the pump rotor configured to rotate on the pump axis coaxial with the common axis and relative to the pump stator to pump fluid,
        wherein the fluid pump includes an elastomer that forms a series of lobe cavities to progressively move a plurality of respective pockets along the common axis.

2. The pump apparatus of claim 1, wherein the plurality of coils are arrayed along the common axis such that each coil of the plurality of coils does not radially overlap any other coil of the plurality of coils.

3. The pump apparatus of claim 1, wherein a closest spur of the plurality of spurs along the common axis is closer to the fluid displacement member than a closest coil of the plurality of coils.

4. The pump apparatus of claim 1, wherein for each circular spur array each spur of the plurality of spurs projects radially toward the motor rotor with respect to the common axis to focus concentrated flux toward the motor rotor.

5. The pump apparatus of claim 4, wherein a circumferential width of each spur of the plurality of spurs narrows as the spur extends toward the motor rotor.

6. The pump apparatus of claim 1, wherein each spur of the plurality of spurs comprises metal.

7. The pump apparatus of claim 1, wherein each spur of the plurality of spurs comprises a first stack of metal laminations, wherein each axial return of the plurality of axial returns comprises a second stack of metal laminations formed separately from the first stack of metal laminations of each spur of the plurality of spurs.

8. The pump apparatus of claim 1, wherein each spur of the plurality of spurs includes a powdered metal piece.

9. The pump apparatus of claim 1, wherein each circular spur array of the plurality of circular spur arrays comprises at least 25 spurs.

10. The pump apparatus of claim 1, wherein the pump rotor is disposed within the pump stator to rotate within the pump stator.

11. The pump apparatus of claim 1, wherein the motor does not include a coil having endturns that extend along the common axis beyond all of the spurs.

12. The pump apparatus of claim 1, wherein the motor stator comprises at least one phase assembly including a first coil of the one or more coils, the first coil disposed axially between a first flux ring of the at least one phase assembly and a second flux ring of the at least one phase assembly.

13. The pump apparatus of claim 1, where the permanent magnet array comprises a plurality of magnets, each magnet having a long axis and a short axis orthogonal to its long axis, the long axis of each magnet extending parallel with the common axis, and each magnet permanently magnetically polarized to have north and south poles respectively at the ends of the short axis.

14. The pump apparatus of claim 13, wherein the one or more coils comprises three coils arrayed along the common axis, wherein none of the three coils circumferentially overlap with each other, and wherein each of the three coils generate a respective magnetic field that interacts with each magnet of the plurality of magnets to rotate the motor rotor.

15. The pump apparatus of claim 1, wherein each coil of the plurality of coils is positioned such that the common axis extends through each coil of the plurality of coils and such that the motor does not include a single coil in which the common axis does not extend through such single coil.

16. The pump apparatus of claim 1, wherein the motor does not include coils disposed at a common axial position along the common axis and arrayed circumferentially around the common axis.

17. The pump apparatus of claim 1, wherein the drive mechanism comprises an elongate screw, the screw coaxial with the common axis, the screw driven by the rotational output so that the screw one of rotates about the common axis and linearly reciprocates along the common axis, and a nut that interfaces with the elongate screw to one of rotate about the common axis and linearly reciprocate along the common axis.

18. The pump apparatus of claim 1, wherein the motor stator comprises:
one or more phase assemblies disposed along the common axis, each phase assembly of the one or more phase assemblies including a coil of the plurality of coils disposed axially between a first flux ring of the first circular spur array of the phase assembly and a second flux ring of the second circular spur array.

19. The pump apparatus of claim 18, wherein each phase assembly of the one or more phase assemblies further comprises the plurality of axial returns extending between and connecting the first flux ring and the second flux ring.

20. The pump apparatus of claim 19, wherein each respective coil of the plurality of coils is disposed in an annular chamber coaxial with the common axis and defined by the first flux ring, the second flux ring, and the plurality of axial returns.

21. The pump apparatus of claim 1, wherein, in each set of paired circular spur arrays the plurality of spurs of the first circular spur array and the plurality of spurs of the second circular spur array are radially offset from the respective coil located between the set of paired circular spur arrays such that the plurality of spurs of the first circular spur array and the plurality of spurs of the second circular spur array extend radially beyond the respective coil.

22. A pump apparatus for pumping fluid, the apparatus comprising:
an electric motor configured to generate a rotational output, the electric motor comprising:
a motor rotor configured to rotate about a common axis, the motor rotor comprising a permanent magnet array, the permanent magnet array disposed annularly around the common axis; and
a motor stator configured to be electrically energized to generate magnetic flux that causes the motor rotor to rotate, the motor stator comprising:
a plurality of coils, the plurality of coils arrayed along the common axis, each coil of the plurality of coils coaxial with the common axis; and
a plurality of circular spur arrays that are arrayed along the common axis, each circular spur array of the plurality of circular spur arrays respectively comprising:
a plurality of spurs that are arrayed in a circle coaxial with the common axis, all spurs of the plurality of spurs of the respective circular spur array configured to be polarized simultaneously by a respective coil of the plurality of coils to generate flux to rotate the motor rotor relative to the motor stator;
wherein the plurality of circular spur arrays are arranged in sets of paired circular spur arrays, each set of paired circular spur arrays has a first circular spur array and a second circular spur array, and each respective coil of the plurality of coils is located between a respective set of paired circular spur arrays;
wherein each set of paired circular spur arrays includes a plurality of axial returns extending between and spaced radially from the plurality of spurs of the first circular spur array of the set of paired circular spur arrays and the plurality of spurs of the second circular spur array of the set of paired circular spur arrays, and wherein the plurality of axial returns of each set of paired circular spur arrays is configured to allow a flux circuit to polarize pairs of spurs on the first circular spur array and the second circular spur array; and
a fluid pump operably connected to the electric motor to be powered by the electric motor, the fluid pump comprising:
a pump stator; and
a pump rotor disposed coaxially with the motor axis and connected to the motor rotor to receive the rotary output from the motor rotor to be rotated on the pump axis and relative to the pump stator,
wherein the fluid pump includes an elastomer that forms a series of lobe cavities to progressively move a plurality of respective pockets along the common axis.

23. A pump apparatus for pumping fluid, the apparatus comprising:
an electric motor configured to generate a rotational output, the electric motor comprising:
a motor rotor configured to rotate about a common axis, the motor rotor comprising a permanent magnet array, the permanent magnet array disposed annularly around the common axis; and a motor stator configured to be electrically energized to generate magnetic flux that causes the motor rotor to rotate, the motor stator comprising:
- a plurality of coils, the plurality of coils arrayed along the common axis, each coil of the plurality of coils coaxial with the common axis; and
- a plurality of circular spur arrays that are arrayed along the common axis, each circular spur array of the plurality of circular spur arrays respectively comprising:
  - a plurality of spurs that are arrayed in a circle coaxial with the common axis, all spurs of the plurality of spurs of the respective circular spur array configured to be polarized simultaneously by a respective coil of the plurality of coils to generate flux to rotate the motor rotor relative to the motor stator;

wherein the motor stator comprises at least one phase assembly, and wherein for each phase assembly, each respective coil of the plurality of coils is disposed axially between a first flux ring of the phase assembly and a second flux ring of the phase assembly, and the first flux ring includes a plurality of branches, each branch extending radially with respect to the common axis, the plurality of spurs of the first flux ring respectively supported by the plurality of branches such that each branch supports at least three respective spurs of the plurality of spurs of the first flux ring; and a fluid pump operably connected to the electric motor to be powered by the electric motor, the fluid pump comprising:
  - a pump stator; and
  - a pump rotor disposed coaxially with the motor axis and connected to the motor rotor to receive the rotary output from the motor rotor to be rotated on the pump axis and relative to the pump stator,
  - wherein the fluid pump includes an elastomer that forms a series of lobe cavities to progressively move a plurality of respective pockets along the common axis.

\* \* \* \* \*